(12) United States Patent
Zheng et al.

(10) Patent No.: US 12,099,025 B2
(45) Date of Patent: Sep. 24, 2024

(54) DEVICE AND METHOD FOR MEASURING SHORT-WAVELENGTH CHARACTERISTIC X-RAY DIFFRACTION BASED ON ARRAY DETECTION

(71) Applicant: THE 59TH INSTITUTE OF CHINA ORDNANCE INDUSTRY, Chongqing (CN)

(72) Inventors: Lin Zheng, Chongqing (CN); Shitao Dou, Chongqing (CN); Xin Chen, Chongqing (CN); Lunwu Zhang, Chongqing (CN); Jin Zhang, Chongqing (CN); Taibin Wu, Chongqing (CN); Luchang Che, Chongqing (CN); Chengzhang Wang, Chongqing (CN); Kun Zhou, Chongqing (CN); Fangchao Zhao, Chongqing (CN); Changguang He, Chongqing (CN); Xianhe Feng, Chongqing (CN)

(73) Assignee: THE 59TH INSTITUTE OF CHINA ORDNANCE INDUSTRY, Chongqing (CN)

( * ) Notice: Subject to any disclaimer, the term of this patent is extended or adjusted under 35 U.S.C. 154(b) by 3 days.

(21) Appl. No.: 17/849,632

(22) Filed: Jun. 25, 2022

(65) Prior Publication Data
US 2022/0412901 A1 Dec. 29, 2022

(30) Foreign Application Priority Data
Jun. 25, 2021 (CN) .......................... 202110709363.2

(51) Int. Cl.
*G01N 23/207* (2018.01)
*G01N 23/20008* (2018.01)
(Continued)

(52) U.S. Cl.
CPC ..... *G01N 23/207* (2013.01); *G01N 23/20008* (2013.01); *G01N 23/20091* (2013.01);
(Continued)

(58) Field of Classification Search
None
See application file for complete search history.

(56) References Cited

U.S. PATENT DOCUMENTS 5,265,144 A * 11/1993 Harding ................. G21K 1/025
378/86
5,373,544 A 12/1994 Goebel
(Continued)

FOREIGN PATENT DOCUMENTS

CN 101358938 A 2/2009
CN 111380880 A 7/2020
(Continued)

OTHER PUBLICATIONS

JP2008506127 and English translation (Year: 2008).*
(Continued)

*Primary Examiner* — Thomas R Artman
(74) *Attorney, Agent, or Firm* — Yue (Robert) Xu; Apex Attorneys at Law, LLP

(57) ABSTRACT

A device for measuring short-wavelength characteristic X-ray diffraction based on array detection, and a measurement and analysis method based on the device are provided. An array detector of the device only detects and receives a diffraction ray which is diffracted by a material of a to-be-measured part inside a sample and passes through a through hole of a receiving collimator, and rays passing through a positioning hole. The to-be-measured part inside the sample is placed at the center of the diffractometer circle of the device. The method is performed with the device. With the present disclosure, a diffraction pattern of a part inside the (Continued)

sample with a centimeter thickness, i.e. Debye rings, can be rapidly and non-destructively measured, thereby rapidly and non-destructively measuring and analyzing crystal structures, and its crystal structural change of the part inside the sample, such as phase, texture, and stress.

10 Claims, 6 Drawing Sheets

(51) Int. Cl.
    *G01N 23/20091*     (2018.01)
    *G01N 23/2055*     (2018.01)

(52) U.S. Cl.
    CPC . *G01N 23/2055* (2013.01); *G01N 2223/0563* (2013.01); *G01N 2223/0566* (2013.01); *G01N 2223/1016* (2013.01); *G01N 2223/204* (2013.01); *G01N 2223/3037* (2013.01); *G01N 2223/316* (2013.01); *G01N 2223/3306* (2013.01); *G01N 2223/3307* (2013.01); *G01N 2223/3308* (2013.01); *G01N 2223/331* (2013.01); *G01N 2223/501* (2013.01); *G01N 2223/605* (2013.01); *G01N 2223/606* (2013.01); *G01N 2223/607* (2013.01)

(56) References Cited

U.S. PATENT DOCUMENTS

| | | | | |
|---|---|---|---|---|
| 5,491,738 | A * | 2/1996 | Blake | G01N 23/207 378/90 |
| 6,483,894 | B2 | 11/2002 | Hartick et al. | |
| 6,510,201 | B2 * | 1/2003 | Martens | G01N 23/20 250/363.03 |
| 7,492,863 | B2 * | 2/2009 | Harding | G01N 23/20 378/71 |
| 7,583,788 | B2 * | 9/2009 | Zheng | G01N 23/207 378/81 |
| 7,697,664 | B2 * | 4/2010 | Harding | G01N 23/207 378/71 |
| 7,796,726 | B1 * | 9/2010 | Gendreau | G01N 23/20 378/80 |
| 7,885,383 | B1 * | 2/2011 | He | G01N 23/205 378/71 |
| 9,146,203 | B2 * | 9/2015 | Toraya | G01L 1/25 |
| 9,222,900 | B2 * | 12/2015 | Lauridsen | G01N 23/207 |
| 9,921,173 | B2 * | 3/2018 | Evans | G01N 23/20083 |
| 10,121,561 | B2 * | 11/2018 | Marticke | G01N 23/20091 |
| 10,161,888 | B2 * | 12/2018 | Ikeda | G01N 23/207 |
| 10,416,102 | B2 * | 9/2019 | He | G01N 23/2055 |
| 10,591,425 | B2 * | 3/2020 | Sato | G01N 23/207 |
| 11,099,143 | B2 * | 8/2021 | Griffiths | G01N 23/20008 |
| 11,105,756 | B2 * | 8/2021 | Xiang | G01N 23/087 |
| 11,397,154 | B2 * | 7/2022 | He | G01N 23/20025 |
| 11,846,595 | B2 * | 12/2023 | Zheng | G01N 23/20025 |
| 2002/0094061 | A1 * | 7/2002 | Martens | G01N 23/20 378/86 |
| 2007/0263771 | A1 * | 11/2007 | Harding | G01N 23/207 378/71 |
| 2008/0031415 | A1 * | 2/2008 | Harding | G01N 23/20 378/71 |
| 2008/0095311 | A1 | 4/2008 | Zheng et al. | |
| 2008/0170664 | A1 * | 7/2008 | Kalman | G21K 1/025 378/71 |
| 2011/0007869 | A1 * | 1/2011 | Gendreau | G01N 23/20 378/46 |
| 2013/0121470 | A1 * | 5/2013 | Toraya | G01L 1/25 378/72 |
| 2014/0254763 | A1 * | 9/2014 | Lauridsen | G01N 23/207 378/73 |
| 2015/0362443 | A1 * | 12/2015 | Evans | G01N 23/20083 378/4 |
| 2016/0223706 | A1 * | 8/2016 | Franco | G01V 5/0041 |
| 2017/0125133 | A1 | 5/2017 | Marticke et al. | |
| 2018/0202948 | A1 * | 7/2018 | Sato | G01N 23/207 |
| 2018/0372658 | A1 * | 12/2018 | He | G01N 23/2055 |
| 2020/0158667 | A1 * | 5/2020 | Xiang | G01N 23/2055 |
| 2020/0225171 | A1 * | 7/2020 | Griffiths | G01N 29/0681 |
| 2021/0033546 | A1 * | 2/2021 | He | G01N 23/20025 |
| 2022/0074877 | A1 | 3/2022 | Zheng et al. | |
| 2022/0412901 | A1 * | 12/2022 | Zheng | G01N 23/20091 |

FOREIGN PATENT DOCUMENTS

| | | | |
|---|---|---|---|
| CN | 113310611 A * | 8/2021 | |
| EP | 1767928 A1 | 3/2007 | |
| GB | 2083969 A | 3/1982 | |
| GB | 2560165 A | 9/2018 | |
| JP | 2003517602 A | 5/2003 | |
| JP | 2008506127 A * | 2/2008 | |
| WO | 0144792 A2 | 6/2001 | |

OTHER PUBLICATIONS

Internal Residual Stress and Texture Homogenization in Pre-stretch Aluminum Alloy Plates, Journal of Netshape Forming Engineering, vol. 6, No. 5, Sep. 2014.
The European search report issued on Oct. 27, 2022 for EP22181095.5.
The Japanese 1st Office Action issued on Jun. 6, 2023 for JP2022-101826.
Kohri Ami, Takaku Yasuhiro, Suzuki Kenji, Nakashiro Masashi, Confirmation of effectiveness of X-ray residual stress measurement using cosα method,IIC Review, Japan, IHI Inspection and Measurement Co., Ltd., Apr. 30, 2015, vol. 53, pp. 48 to 53.
Tanaka, Keisuke (2017). X-Ray Stress Measurement by The Cos a Method Using Two-Dimensional Detector Part 1: Fundamentals of Measurements. Journal of the Society of Materials Science, Japan, 66(7), 470-478. https://www.stage.jst.go.jp/article/jsms/66/7/66_470/_pdf.

* cited by examiner

DEVICE AND METHOD FOR MEASURING SHORT-WAVELENGTH CHARACTERISTIC X-RAY DIFFRACTION BASED ON ARRAY DETECTION

The present application claims priority to Chinese Patent Application No. 202110709363.2, titled "DEVICE AND METHOD FOR MEASURING SHORT-WAVELENGTH CHARACTERISTIC X-RAY DIFFRACTION BASED ON ARRAY DETECTION", filed on Jun. 25, 2021 with the Chinese Patent Office, which is incorporated herein by reference in its entirety.

FIELD

The present disclosure relates to the technical field of X-ray non-destructive testing, and in particular to a device for measuring short-wavelength characteristic X-ray diffraction based on array detection, and a measurement and analysis method based on the device.

BACKGROUND

According to the document of "Research on Internal Residual Stress and Grain Orientation Uniformity of Pre-stretch Thick Aluminum Plate" published by Zheng Lin and others in the Journal of "NETSHAPE FORMING ENGINEERING", an SWXRD-1000 short-wavelength characteristic X-ray diffractometer is adopted to perform fixed-point non-destructive detection on distribution of WK $\alpha_1$ diffraction intensity along an diffraction angle $2\theta$, that is a diffraction pattern, of a material at a position inside a pre-stretch aluminum alloy plate with a thickness ranging from 20 mm to 25 mm. However, the short-wavelength characteristic X-ray diffractometer can only measure a WK $\alpha_1$ diffraction intensity in one direction each time, and it is required to scan and measure dozens of WK $\alpha_1$ diffraction intensities at the angle $2\theta$ step by step to obtain an Al(111) crystal plane diffraction pattern of a to-be-measured part and to calculate an Al(111) interplanar spacing, which takes tens of minutes. To measure a full diffraction pattern of material at the part, it will take hours to scan in steps, and only information about a small diffraction of a diffraction pattern is obtained. In short, the aforementioned technology for measuring and analyzing a diffraction pattern has problems of too long measurement time and very little diffraction information. Moreover, it takes more time in performing fixed-point non-destructive detection and analysis on phase, texture, residual stress and the like inside a material/workpiece with the aforementioned technology for measuring and analyzing a diffraction pattern, greatly restricting the application of the technology. Therefore, how to provide a method and an apparatus for quickly obtaining more diffraction information has become a focus of the technical field.

In addition, a diffraction device is provided according to a document CN111380880A. The diffraction device includes an X-ray irradiation system and an X-ray detection system. The X-ray irradiation system irradiates an X-ray to a measurement part of a to-be-measured sample. The X-ray detection system simultaneously detects multiple X-rays diffracted by multiple parts of the to-be-measured sample to obtain diffraction intensity distributions of the X-rays diffracted by the multiple parts of the to-be-measured sample. The X-ray for measurement is a short-wavelength characteristic X-ray. The X-ray detection system is a parallel light array detection system. With the device, orientation uniformity of crystals inside a workpiece can be detected quickly. However, diffractions by multiple parts of the sample in one direction are simultaneously imaged, diffractions by one part of the sample in multiple directions cannot be simultaneously imaged, a Debye ring or diffraction patterns of the diffraction by one part of the sample cannot be achieved, and rapid and non-destructive measurement and analysis of the phase, the texture and the stress of the material of the one part of the sample cannot be performed based on an imaged Debye ring or imaged diffraction pattern.

SUMMARY

A device for measuring short-wavelength characteristic X-ray diffraction based on array detection, and a measurement and analysis method based on the device are provided according to the present disclosure to quickly perform fixed-point non-destructive detection and analysis on phase, texture and stress inside a sample, solving the problem of fixed-point non-destructive detection and analysis that cannot be quickly performed according to the conventional diffraction device and method.

The following technical solutions are realized according to the present disclosure.

A device for measuring short-wavelength characteristic X-ray diffraction based on array detection is provided according to the present disclosure. The device includes an X-ray irradiation system, a sample table and an X-ray detection system. The X-ray irradiation system includes a radiation source and an incident collimator. The radiation source includes a heavy metal target X-ray tube with an atomic number greater than 55, a high-voltage power supply with a power supply voltage greater than 160 kv and a controller. The incident collimator is configured to limit a divergence of an X-ray beam incident on a sample, a shape and a size of a cross-section of the X-ray beam. X-rays emitted by the X-ray irradiation system pass through the incident collimator to form the incident X-ray beam, and the incident X-ray beam irradiates a to-be-measured part inside a sample (the sample in the represent disclosure refers to a sample to be measured) fixed on the sample table. The X-ray detection system is configured to perform fixed-point measurement on intensity and distribution of a short-wavelength characteristic X-rays diffracted by the to-be-measured part inside the sample. The X-ray detection system includes a receiving collimator and an array detector matched with the receiving collimator. The array detector is configured to detect and receive a diffraction ray that is diffracted by the to-be-measured part inside the sample and passes through a through hole A of the receiving collimator, and other stray rays passing through the through hole A of the receiving collimator. An extension line of a first inner cone edge of the through hole A interests with an extension line of a second inner cone edge of the through hole A intersect at an intersection point located on a central line of the incident X-ray beam, and the intersection point is a center of a diffractometer circle of the device. The to-be-measured part inside the sample is placed at the center of the diffractometer circle of the device.

In an embodiment, each of detection pixels of the array detector is configured to perform single-photon measurement, the array detector is a multi-energy array detector with two or more energy thresholds, and each of the detection pixels measures one or more short-wavelength characteristic X-rays based on predetermined energy thresholds. Alternatively, the array detector is an energy dispersive array detector, and each of the pixels is capable of measuring one or more short-wavelength characteristic X-rays. In another embodiment, the array detector is housed in a shielding box for shielding stray X-rays.

In an embodiment, a through hole B of the incident collimator is a circular hole or a rectangular hole. A length of the incident collimator ranges from 20 mm to 200 mm. A divergence of the incident collimator ranges from 0.02° to 0.5°.

In an embodiment, a length of the receiving collimator ranges from 100 mm to 1200 mm. An angle between the first inner cone edge of the through hole A of the receiving collimator and the incident X-ray beam is represented by γ, and γ ranges from 2° to 10°. An angle between the first inner cone edge of the through hole A and the second inner cone edge of the through hole A is represented by δ, and δ ranges from 0.5° to 6°. A sum of γ and δ is not greater than 12°.

In order to facilitate operations and further improve the accuracy of the measurement result, a positioning hole for diffraction patterns is defined in a central part of the receiving collimator. An axis of the positioning hole coincides with a central line of the incident X-ray beam (that is, a central axis of the incident collimator). An X-ray absorber is arranged in the positioning hole. The X-ray absorber is configured to prevent the array detector from being irradiated and damaged by the high-flux incident X-ray beam, and determine a position at which a maximum intensity of X-rays are transmitted by detecting distribution of intensities of the incident X-ray passing through the X-ray absorber, that is, determine a position of a center of a Debye ring or a diffraction pattern. The incident collimator, the receiving collimator and the shielding box of the array detector are made of heavy metal materials meeting the shielding requirements for shielding stray X-rays from other parts and other directions, so that X-rays pass through the through hole B of the incident collimator, the through hole A of the receiving collimator, the positioning hole, the X-ray absorber in the positioning hole, and a receiving window of the shielding box of the array detector, and then enter a detection region of the array detector.

In an embodiment, the X-ray irradiation system, the sample table and the X-ray detection system are fixed on a same platform. The sample is fixed on a translation table of the sample table. The translation table is fixed on a Φ angle turntable, and the Φ angle turntable is fixed on a Ψ angle turntable. The Ψ angle turntable is fixed on the platform. A rotation axis of the Φ angle turntable and a rotation axis of the Ψ angle turntable are perpendicular to each other and intersect at the center of the diffractometer circle, so that the to-be-measured part inside the sample is always located at the center of the diffractometer circle without moving with rotation of the Φ angle turntable or the ψ angle turntable. Alternatively, in another embodiment, the X-ray irradiation system and the X-ray detection system are fixed on a ψ angle turntable. The ψ angle turntable and a sample table including a translation table and a Φ angle turntable are fixed on a same platform. The sample is fixed on the translation table of the sample table, and the translation table is fixed on the Φ angle turntable. The Φ angle turntable is fixed on the platform. A rotation axis of the Φ angle turntable and a rotation axis of the ψ angle turntable are perpendicular to each other and intersect at the center of the diffractometer circle, so that the to-be-measured part inside the sample is always located at the center of the diffractometer circle without moving with rotation of the Φ angle turntable or the ψ angle turntable.

In an embodiment, a central line of the positioning hole coincides with the central line of the incident collimator, and is parallel to a Z axis of the translation table in a case of Ψ=0°. Coordinates of a center of a Debye ring of diffraction do not change with rotation or translation of the sample, that is, coordinates of the position at which the incident X-ray beam reaches the array detector do not change. The coordinates of the center of the Debye ring are set to (0,0,0), as shown in FIG. 6. A distance t from the center of the diffractometer circle of the device to the array detector ranges from 150 mm to 1500 mm, that is, the distance from the to-be-measured part inside the sample to the array detector is t.

With the device according to the present disclosure, the Debye ring of the diffraction of the to-be-measured part can be intuitively measured, and a diffraction pattern similar to a diffraction pattern captured by an X-ray diffraction flat panel camera is obtained. After the diffraction pattern is exposed and measured, a diffraction peak of a (hkl) crystal plane in a direction is determined, and the coordinates (x, y, −t) of the center of the Debye ring are obtained, as shown in FIG. 6. A diffraction angle 2 θ of the diffraction peak meets $$\tan(2\theta) = \frac{\sqrt{x^2 + y^2}}{t}.$$

Therefore, after the diffraction peak is determined and the coordinates (x, y, −t) are obtained, the diffraction angle 2 θ may be calculated.

In an embodiment, detection pixels of the array detector range from 0.02 mm to 0.2 mm. The array detector is a cadmium telluride array detector, a cadmium zinc telluride array detector or a gallium arsenide array detector.

A measurement and analysis method based on the device for measuring short-wavelength characteristic X-ray diffraction described above is provided according to an embodiment the present disclosure. The method adopts a transmission and diffraction method using short-wavelength characteristic X-rays. The measurement and analysis method includes:

step 1, selecting a short-wavelength characteristic X-ray (for example, Wk $\alpha_1$ radiated by a tungsten target X-ray tube or Uk $\alpha_1$ radiated by a uranium target X-ray tube) with an appropriate wavelength based on a material and a thickness of the sample, and setting two energy thresholds of the array detector where each of the pixels of the array detector detects the selected short-wavelength characteristic X-ray (for example, Wk $\alpha_1$ or Wk α, or Uk $\alpha_1$ or Uk α);

step 2, fixing the sample on the sample table, and placing the to-be-measured part inside the sample at the center of the diffractometer circle;

step 3, applying a tube voltage greater than 1.5 times a target excitation voltage based on the selected short-wavelength characteristic X-ray to start the X-ray irradiation system;

step 4, exposing and measuring a Debye ring or a diffraction pattern of diffraction of a crystal material of the to-be-measured part, performing peak determination, and comparing the Debye ring or the diffraction pattern with a powder diffraction file (PDF) to determine a phase of the crystal material of the to-be-measured part;

step 5, for measuring a texture or an orientation of a main phase of the to-be-measured part, rotating the Ψ angle turntable to perform step-by-step scanning and measurement, exposing and measuring Debye rings of diffraction of the crystal material of the to-be-measured part at different Ψ angles; performing peak determination; measuring, for each of diffraction crystal planes, diffraction intensities of a Debye ring in the diffraction crystal plane in different directions; performing absorption correction based on a diffraction path length to obtain, for each of the diffraction crystal planes, corrected diffraction intensities of the Debye ring in the diffraction crystal plane in different directions; obtaining transmission pole maps of the main phase in multiple strong diffraction crystal planes and relatively strong diffraction crystal planes; and selecting the transmission pole maps of the main phase in the multiple strong diffraction crystal planes according to a crystal system type to calculate a full pole map or an orientation distribution function (ODF) of the multiple strong diffraction crystal planes, where it should be noted that different crystal systems lead to different symmetries; for a crystal system with higher symmetry, a less number of transmission pole maps are required in calculating the full pole map or the orientation distribution function (ODF) of the corresponding diffraction crystal planes, that is, a less number of diffraction crystal planes (Debye rings) of the main phase are required to be calculated in measuring the Debye rings of the diffraction of the crystal material of the to-be-measured part at different θ; for example, for an fcc crystal system, it is only required to measure transmission pole maps of three strong diffraction crystal planes in calculating the full pole map or the orientation distribution function (ODF); and for example, it is only required to measure transmission pole maps of three strong lines of crystal planes (111), (200) and (220) to calculate the full pole map or the orientation distribution function (ODF) of the diffraction crystal planes;

step 6, for measuring a residual stress of the to-be-measured part, measuring strains of one (hkl) crystal plane or multiple (hkl) crystal planes of the main phase in multiple directions, and calculating a stress tensor σ of the to-be-measured part inside the sample based on a the stress-strain relationship in elastic mechanics, where (1) in measuring a residual stress of a sample in a plane stress state, (a) for a sample made of a non-strong-texture material, the sample and a stress-free standard sample are rotated by rotating the W angle turntable, so that a surface normal of the to-be-measured part inside the sample and a surface normal of a corresponding part of the stress-free standard sample coincide with the incident beam; then a Debye ring or a strong diffraction spot of diffraction of the to-be-measured part inside the sample in each of crystal planes of the to-be-measured part is exposed and measured and a Debye ring or a strong diffraction spot of diffraction of a corresponding part of the stress-free standard sample in each of crystal planes of the corresponding part is exposed and measured; peak determination is performed to obtain, for each of the crystal planes of the to-be-measured part inside the sample, diffraction angles 2 $\theta_{s-hkl}$ of the to-be-measured part in the crystal plane in different directions and obtain, for each of the crystal planes of the corresponding part of the stress-free standard sample, diffraction angles 2 $\theta_{0-hkl}$ of the corresponding part in the crystal plane in different directions; and then, for a (hkl) crystal plane (such as crystal plane Al (111)), a strain $\varepsilon(90°-\theta_{hkl}, \Phi)$ at an angle of $90°-\theta_{hkl}$ with the surface normal of the to-be-measured part inside the sample, and strains in all directions of a (hkl) crystal plane obtained by encircling the surface normal of the to-be-measured part inside the sample and distribution of the strains are calculated by using the following equation (1):

$$\varepsilon = \frac{d_{s-hkl} - d_{0-hkl}}{d_{0-hkl}} = \frac{\Delta d_{hkl}}{d_{0-hkl}} = \frac{\sin\theta_{0-hkl}}{\sin\theta_{s-hkl}} - 1 \quad (1)$$

where $d_{s-hkl}$ represents a distance between (hkl) crystal planes of the to-be-measured part inside the sample along a measurement direction; $d_{0-hkl}$ represents a distance between crystal planes of the corresponding part of the stress-free standard sample along a corresponding direction; and $\Delta d_{hkl}$ represents a variation of distances between the (hkl) crystal planes of the to-be-measured part inside the sample along the measurement direction;

since the wavelength of the short-wavelength characteristic X-ray is about 0.02 nm and a diffraction angle 2 θ of a strong diffraction crystal plane or a relatively strong diffraction crystal plane of most substances is less than 11°, that is, $\theta_{hkl}$<5.5° (in a case that the selected short-wavelength characteristic X-ray is Wk $\alpha_1$, for the crystal plane Al(111), the diffraction angle $2\theta_{111} \approx 5.12°$, and $\theta_{111} \approx 2.56°$, in each of the directions of the (hkl) crystal plane, a difference between the calculated strain $\varepsilon(90°-\theta_{hkl}, \Phi)$ in the direction and a strain $\varepsilon(90°, \Phi)$ of the (hkl) crystal plane in a direction perpendicular to the direction of the surface of the to-be-measured part inside the sample is small, that is, less than 5.5°, so that the strains may be regarded as equal to each other (0°≤Φ·180°, that is, $\varepsilon(90°, \Phi) = \varepsilon(90°-\theta_{hkl}, \Phi)$, according to a stress-strain relationship of a plane stress problem in elastic mechanics, in an xy plane, it is assumed that an X-axis and a Y-axis respectively represent a principal stress direction, and a strain $\varepsilon_{xx}$, that is $\varepsilon(90°-\theta_{hkl}, 90°)$, in a direction of the X-axis, and a strain $\varepsilon_{yy}$, that is $\varepsilon(90°-\theta_{hkl}, 0°)$, in a direction of the Y-axis are measured, and then two principal stresses $\sigma_{xx}$ and $\sigma_{yy}$ are calculated by using the following equations:

$$\sigma_{xx} = \frac{E_{hkl}}{1+v_{hkl}^2}(\varepsilon_{xx} + v_{hkl}\varepsilon_{yy}) \quad (2)$$

$$\sigma_{yy} = \frac{E_{hkl}}{1+v_{hkl}^2}(\varepsilon_{yy} + v_{hkl}\varepsilon_{xx}) \quad (3)$$

where $E_{hkl}$ represents an elastic modulus of a (hkl) crystal plane, and \T$_h$u represents a Poisson ratio of the (hkl) crystal plane;

based on the obtained strains $\varepsilon(90°-\theta_{hkl}, 90°)$ and $\varepsilon(90°-\theta_{hkl}, 0°)$ of the (hkl) crystal plane (such as the crystal plane Al(111)) in directions of the two principal stresses, two principal stresses $\sigma_{xx}$ and $\sigma_{yy}$ in a direction perpendicular to the surface normal of the to-be-measured part inside the sample, that is, a plane stress tensor σ of the to-be-measured part inside the sample, are calculated by using the equations (2) and (3);

in a case that the directions of the two principal stresses are unknown, according to the theory of elasticity, it is only required to measure strains in three directions to obtain magnitudes and directions of two principal stresses and one shear stress, that is, the plane stress tensor a of the to-be-measured part inside the sample;

it should be noted that ($\Psi$, $\Phi$) are coordinates on a pole may of a (hkl) crystal plane and represent a crystal orientation; the X-axis is perpendicular to the Y-axis; taking a rolled plate as an example, (90°, 0°) represents a rolling direction RD (often defined as coinciding with the Y-axis), (90°, 90°) represents a transverse direction TD (often defined as coinciding with the X-axis), W represents an angle deviating from a normal direction ND (often defined as coinciding with the Z-axis), and it is apparent that $0 \le \psi \le 90°$; $\Phi$ represents an angle formed by rotating counterclockwise with the ND direction (Z-axis) and starting from the RD (Y-axis), and it is apparent that $0° \le \Phi < 360°$; and in a case that Debye rings or strong diffraction spots in multiple strong diffraction crystal planes and relatively strong diffraction (hkl) crystal planes are measured, strains $\varepsilon(90°-\theta_{hkl}, \phi)$ and distributions of the strains $\varepsilon(90°-\theta_{hkl}, \phi)$ of the multiple strong diffraction crystal planes and relatively strong diffraction (hkl) crystal planes may be calculated, then multiple stress tensors σ may be calculated based on the calculated $\varepsilon(90°-\theta_{hkl}, \Phi)$ and distributions of $\varepsilon(90°-\theta_{hkl}, \Phi)$ of the multiple strong diffraction crystal planes and relatively strong diffraction (hkl) crystal planes, and then an accurate stress tensor $\bar{\sigma}$ is calculated by using an arithmetic mean algorithm or a least square algorithm, that is, the stress tensor $\bar{\sigma}$ may be obtained by exposing and measuring the to-be-measured part inside the sample and the corresponding part of the stress-free standard sample once;

(b) for a sample made of a strong-texture material, a direction in which a strain is measured is determined based on the texture, a strong diffractive (hkl) crystal plane to be measured is determined, a maximum diffraction intensity (a large polar density or a strong diffraction spot) is obtained on an outermost circle in a pole map of the (hkl) crystal plane and is in directions of two principal stresses $\sigma_{xx}$ and $\sigma_{yy}$ or near the directions of the two principal stresses;

the sample is rotated by rotating the $\Psi$ angle turntable, so that a surface normal of the to-be-measured part inside the sample coincides with the incident beam; a Debye ring or a strong diffraction spot of diffraction of the to-be-measured part inside the sample in each of crystal planes of the to-be-measured part is exposed and measured and a Debye ring or a strong diffraction spot of diffraction of a corresponding part of the stress-free standard sample in each of crystal planes of the corresponding part is exposed and measured;

peak determination is performed on strong diffraction spots of the Debye rings to determine an angle α and an angle β, where the angle α represents an angle by which deviating from the X-axis to obtain a maximum polar density, and the angle β represents an angle by which deviating from the Y-axis to obtain a maximum polar density, for example, the directions of the maximum polar density may be the transverse direction (TD) and a direction deviating from the rolling direction (RD) by 20° (such as, α=0° and β=20° on the outmost circle of the pole map of a rolled aluminum plate Al(111);

strains $\varepsilon(90°-\theta_{hkl}, 90°+\alpha)$ and $\varepsilon(90°-\theta_{hkl}, \beta)$ are measured in the way described in (a), $\theta_{hkl} < 5.5°$, that is, $\varepsilon(90°-\theta_{hkl}, \Phi) = \varepsilon(90°, \Phi)$, the measured strain $\varepsilon(90°-\theta_{hkl}, 90°+\alpha)$ is recorded as $\varepsilon_\alpha$, the measured strain $\varepsilon(90°-\theta_{hkl}, \beta)$ is recorded as $\varepsilon_\beta$, and $\varepsilon_\alpha$ and $\varepsilon_\beta$ are substituted into the following equations:

$$\varepsilon_{xx} = \frac{\varepsilon_\alpha \cos^2\beta - \varepsilon_\beta \sin^2\alpha}{\cos^2\alpha\cos^2\beta - \sin^2\alpha\sin^2\beta} \quad (4)$$

$$\varepsilon_{yy} = \frac{\varepsilon_\beta \cos^2\alpha - \varepsilon_\alpha \sin^2\beta}{\cos^2\alpha\cos^2\beta - \sin^2\alpha\sin^2\beta} \quad (5)$$

then the principal strains $\varepsilon_{xx}$ and $\varepsilon_{yy}$ in directions of the two principal stresses $\sigma_{xx}$ and $\sigma_{yy}$ are calculated, and then $\varepsilon_{xx}$ and $\varepsilon_{yy}$ are substituted into equations (2) and (3) to obtain the two principal stresses $\sigma_{xx}$ and $\sigma_{yy}$, that is, a stress tensor σ of the to-be-measured part inside the sample; and therefore, for a sample in a plane stress state, the sample is rotated by rotating the $\Psi$ angle turntable, so that the surface normal of the to-be-measured part inside the sample coincides with the incident beam, that is, the incident beam is perpendicular to the sample; then a Debye ring or a strong diffraction spot of the diffraction of the to-be-measured part inside the sample in each of crystal planes of the to-be-measured part is exposed and measured once and a Debye ring or a strong diffraction spot of diffraction of a corresponding part of a stress-free standard sample in each of crystal planes of the corresponding part is exposed and measured once; and then the plane stress tensor σ of the to-be-measured part inside the sample perpendicular to the surface normal of the to-be-measured part inside the sample may be calculated by using the equations (2) and (3);

(2) for a sample in a general stress state, a relatively strong diffraction plane is selected as a to-be-measured diffraction plane, strains in at least six directions (D) are required to be measured, the six $\Psi$ angles should not all be the same, and a difference between a maximum $\Psi$ angle and a minimum $\Psi$ angle should be as large as possible, and differences between the six $\Phi$ angles should be as large as possible; and it is only required to, at each of two different $\Psi$ angles, expose and measure a Debye ring or a strong diffraction spot of the diffraction of the to-be-measured part inside the sample in each of the crystal planes of the to-be-measured part once and expose and measure a Debye ring or a strong diffraction spot of diffraction of a corresponding part of a stress-free standard sample in each of crystal planes of the corresponding part once to obtain the stress tensor σ of the to-be-measured part inside the sample;

(a) for a sample made of a non-strong-texture material, the sample is rotated to a position at which $\Psi=\Psi_1$, then a Debye ring of the diffraction of the to-be-measured part inside the sample in each of crystal planes of the to-be-measured part is exposed and measured and a Debye ring of diffraction of a corresponding part of the stress-free standard sample in each of crystal planes of the corresponding part is exposed and measured; then, the sample is rotated to a position at which $\Psi=\Psi_2$ where a difference between $\Psi_1$ and $\Psi_2$ is as large as possible, then a Debye ring of the to-be-measured part inside the sample in each of crystal planes of the to-be-measured part is exposed and measured and a Debye ring of diffraction of a corresponding part of the stress-free standard sample in each of crystal planes of the corresponding part is exposed and measured; peak determination is performed; peak determination results $2\theta_{s\text{-}hkl}$ and $2\theta_{0\text{-}hkl}$ of the (hkl) crystal plane in six directions are selected; strains $\varepsilon(\Psi_i, \Phi_i)$ of the (hkl) crystal plane in six directions $(\Psi_i, \Phi_i)$ are calculated by using equation (1); and $$\varepsilon(\Psi_i,\Phi_i)=a_i^2\varepsilon_{xx}+b_i^2\varepsilon_{yy}+c_i^2\varepsilon_{yy}+2a_ib_i\varepsilon_{xy}+2b_ic_i\varepsilon_{yz}+2c_ia_i\varepsilon_{zx} \quad (6)$$

where $a_i$ represents a direction cosine of the strain $\varepsilon(\Psi_i, \Phi_i)$ in the X-axis, $b_i$ represents a direction cosine of the strain $\varepsilon(\Psi_i, \Phi_i)$ in the Y-axis, $c_i$ represents a direction cosine of the strain $\varepsilon(\Psi_i, \Phi_i)$ in the Z-axis, $a_i=\sin\Psi_i\cos\Phi_i$, $b_i=\sin\Psi_i\sin\Phi_i$, and $c_i=\cos\Phi_i$;

the measured strains $\varepsilon(\Psi_i;\Phi_i)$ in six directions and the direction cosines of the strains are substituted into the equation (6) to solve the linear equations simultaneously to obtain a strain $\varepsilon_{ij}$ (i=x,y,z; j=x,y,z); then linear transformation is performed on $\varepsilon_{ij}$ to obtain three principal strains $\varepsilon^D_{xx}$, $\varepsilon^D_{yy}$ and $\varepsilon^D_{zz}$; and then the stress tensor σ of the to-be-measured part inside the sample (or the magnitudes and directions of three principal stresses $\sigma^D_{xx}$, $\sigma^D_{yy}$ and $\sigma^D_{zz}$) is calculated by using the following equation (7):

$$\begin{bmatrix} \sigma^D_{XX} \\ & \sigma^D_{YY} \\ & & \sigma^D_{ZZ} \end{bmatrix} = \frac{E}{(1+v)}\begin{bmatrix} \varepsilon^D_{XX} \\ & \varepsilon^D_{YY} \\ & & \varepsilon^D_{ZZ} \end{bmatrix} + \frac{vE}{((1-2v)(1+v))}(\varepsilon^D_{XX}+\varepsilon^D_{YY}+\varepsilon^D_{ZZ})\begin{bmatrix} 1 \\ 1 \\ & 1 \end{bmatrix} \quad (7)$$

where E represents an elastic modulus of the (hkl) crystal plane, and v represents a Poisson ratio of the (hkl) crystal plane;

in a case that the directions of the three principal stresses $\sigma^D_{xx}$, $\sigma^D_{yy}$ and $\sigma^D_{zz}$ are known, it is only required to measure strains in three directions $(\Psi_i, \Phi_i)$ to obtain the stress tensor σ of the to-be-measured part inside the sample; and it is only required to expose and measure the to-be-measured part inside the sample twice and expose and measure the corresponding part of the stress-free standard sample twice to obtain the stress tensor σ;

furthermore, Debye rings of multiple strong diffraction crystal planes and relatively strong diffraction (hkl) crystal planes are measured, so that multiple $\varepsilon(\Psi_i, \Phi_i)$ may be calculated and multiple stress tensors σ may be obtained, then an accurate stress tensor $\overline{\sigma}$ is calculated with the arithmetic mean algorithm or a least square algorithm, that is, the accurate stress tensor $\overline{\sigma}$ may be obtained by exposing and measuring the to-be-measured part inside the sample twice and exposing and measuring the corresponding part of the stress-free standard sample twice;

(b) in measuring a residual stress of a sample made of a strong-texture material, the direction in which the strain is measured is determined based on the texture; and it is required to select a direction in which a maximum diffraction intensity (a large polar density or a strong diffraction spot) of the to-be-measured strong diffraction (hkl) crystal plane is obtained to measure the strain;

the Ψ angle turntable is rotated, thus Debye rings of diffraction of the to-be-measured part inside the sample at different Ψ angles and Debye rings of diffraction of the corresponding part of the stress-free standard sample are measured; directions in which six strong diffraction spots, that is six maximum diffraction intensities, of the strong diffraction crystal plane and relatively strong diffraction (hkl) crystal plane are determined; peak determination is performed; strains $\varepsilon(\Psi_i, \Phi_i)$ in the six directions are calculated by using equation (1); the calculated strains are substituted into the equation (6) to solve the linear equations simultaneously, and linear transformation is performed to obtain three principal strains $\varepsilon^D_{xx}$, $\varepsilon^D_{yy}$ and $\varepsilon^D_{zz}$; a stress tensor σ (or magnitudes and directions of three principal stresses $\sigma^D_{xx}$, $\sigma^D_{yy}$ and $\sigma^D_{zz}$) of the to-be-measured part inside the sample is calculated by using the elastic mechanics equation (7);

it should be noted that the strains obtained in the six directions may not correspond to a same crystal plane family {$h_1k_1l_1$}, that is, strains in some directions are measured based on crystal planes ($h_1k_1l_1$) and strains in other directions are measured based on crystal planes ($h_2k_2l_2$); and in the equations for calculating stresses based on measured strains, the elastic modulus $E_{hkl}$ and the Poisson ratio $v_{hkl}$ corresponding to the measured strains are used;

it should be noted that the stress-free standard sample may be prepared according to certain standard regulations or literature introduction and may be prepared by annealing or wire cutting; and step 7, for measuring phases, textures and stresses in other parts of the sample, repeatedly performing steps 4, 5, and 6 until all the other to-be-measured parts are measured, and performing, by a computer, data processing to obtain the phases, the textures, the stresses, and distributions of the stresses of all the other to-be-measured parts of the sample.

According to the present disclosure, the following beneficial effects can be achieved. With the present disclosure, a diffraction pattern, that is one or more Debye rings or diffraction spots of diffraction, of a part inside a sample with a centimeter-level thickness can be quickly and non-destructively measured, thereby quickly and non-destructively detecting and analyzing crystal structures, such as a phase, a texture, and a stress, and changes of the structures of the part inside the sample. Compared with the technology and devices described in the background, the detection efficiency is improved by more than 10 times according to the present disclosure, and more accurate diffraction information is obtained in each exposure and measurement, greatly improving the detection efficiency and accuracy. With the present disclosure, diffractions of material of one part of the sample in multiple directions can be simultaneously imaged, that is, Debye rings or diffraction patterns of diffractions of the material of one part of the sample can be simultaneously imaged, and then the phase, the texture, the stress and the like of the material of the part of the sample can be quickly and non-destructively detected and analyzed based on the simultaneously imaged Debye rings or diffraction patterns. With the solutions according to the present disclosure, the process of quickly and non-destructively measuring and analyzing the phase, the texture, the stress and the distribution of the stress in the material/workpiece is simple and reliable. More importantly, the device according to the present disclosure has a simple structure and low cost, overcoming the limitation that the high-energy synchronously-radiated hard X-ray diffraction device and technology is difficult to be commercialized, popularized and applied, solving the problem of low measurement efficiency according to the technical solutions disclosed in the background, thereby providing a device and a method with similar function and equivalent detection efficiency as the high-energy synchronously-radiated hard X-ray diffraction device for enterprises, universities and research institutions.

Figure 1:
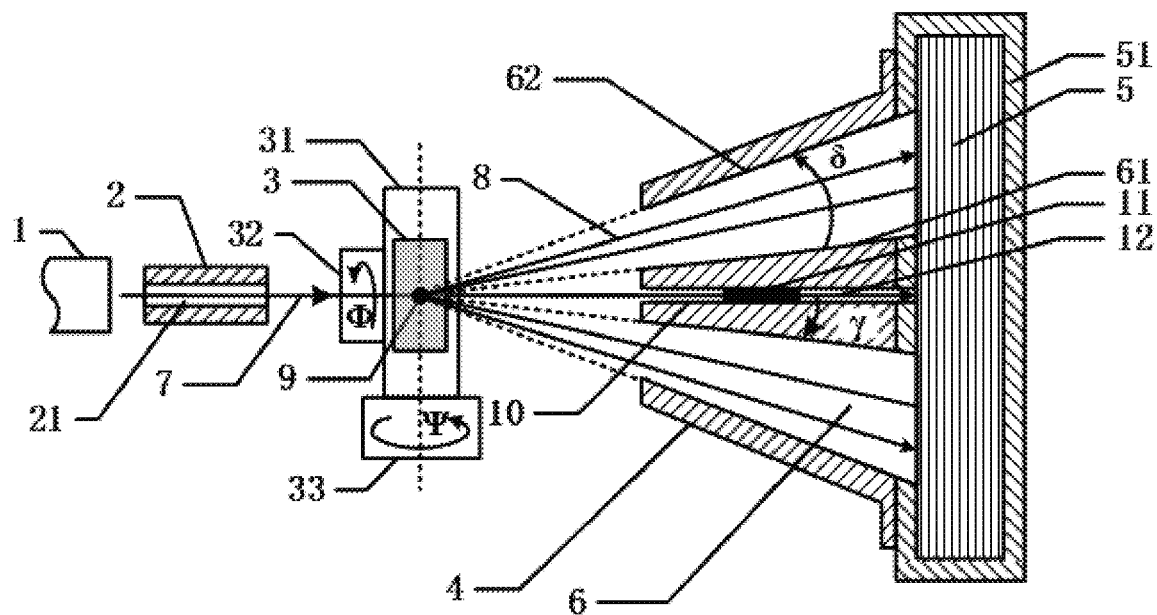
FIG. 1 is a schematic diagram of a device for measuring diffraction according to the present disclosure.
Figure 2:
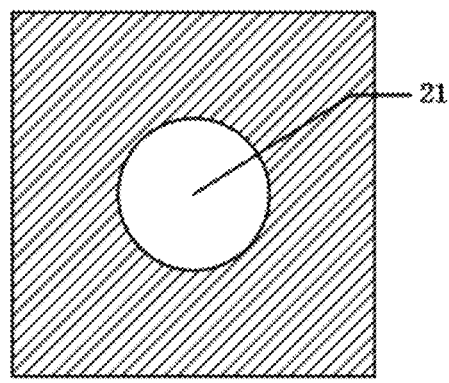
FIG. 2 is a schematic diagram showing a cross section of a circular through hole of an incident collimator of a device for measuring diffraction according to the present disclosure.
Figure 3:
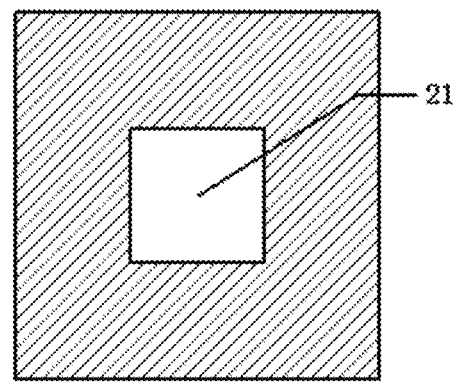
FIG. 3 is a schematic diagram showing a cross section of a rectangular through hole of an incident collimator of a device for measuring diffraction according to the present disclosure.
Figure 4:
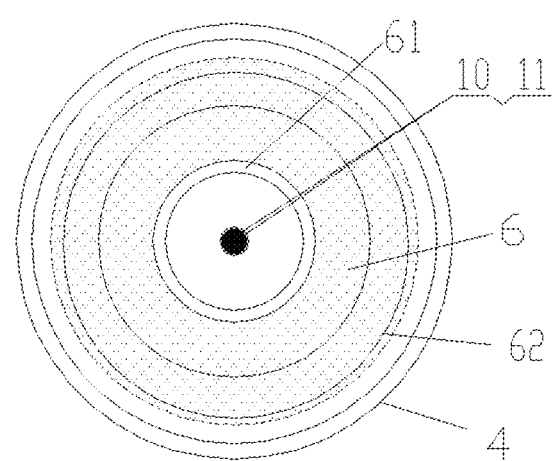
FIG. 4 is a top view of a receiving collimator (viewed from a narrow diameter end of the receiving collimator) according to the present disclosure.
Figure 5:
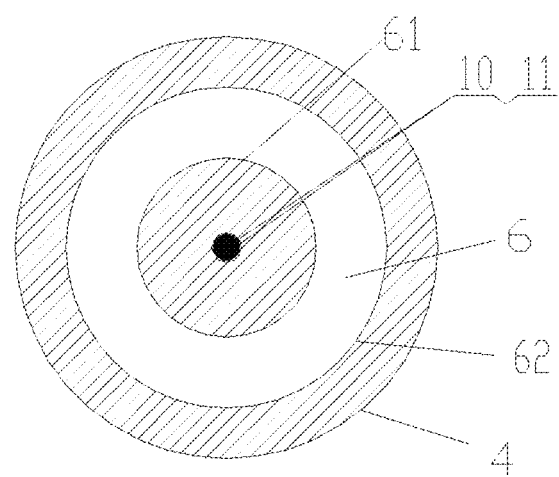
FIG. 5 is a schematic diagram showing a radial cross section of a receiving collimator according to the present disclosure.
Figure 6:
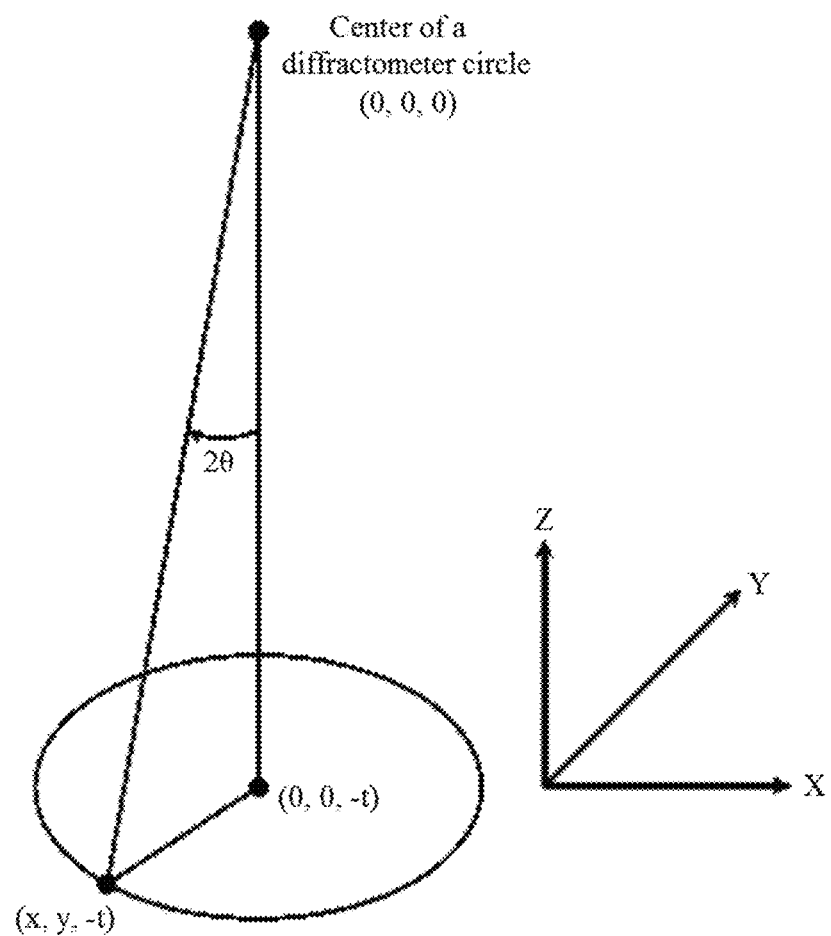
FIG. 6 is a schematic diagram of a diffraction angle measured by an array detector of a device for measuring diffraction is equal to 2θ according to the present disclosure.

Reference numerals are listed as follows:
1 X-ray tube
2 incident collimator
21 through hole of the incident collimator
3 sample
31 translation table
32 Φ angle turntable
33 Ψ angle turntable
4 receiving collimator
5 array detector
51 shielding box of the array detector
6 through hole of the receiving collimator
61 inner cone surface of the through hole
62 outer cone surface of the through hole
7 incident X-ray passing through the incident collimator
8 diffraction ray passing through the receiving collimator
9 center of a diffractometer circle
10 positioning hole on the receiving collimator
11 X-ray absorber
12 transmitted ray passing through the X-ray absorber

DETAILED DESCRIPTION OF THE EMBODIMENTS

The present disclosure is further described below in combination with the drawings and the embodiments. It is pointed out that the following embodiments should not be understood as limitations to the protection scope of the present disclosure. Some non-essential improvements and adjustments made by those skilled in the art according to the contents of the present disclosure are within the protection scope of the present disclosure.

First Embodiment

A device for measuring short-wavelength characteristic X-ray diffraction based on array detection is provided according to the embodiment. As shown in FIG. 1 to FIG. 5, the device includes an X-ray irradiation system, a sample table and an X-ray detection system. X-rays emitted by the X-ray irradiation system pass through an incident collimator 2 to form an incident X-ray beam 7, and the incident X-ray beam 7 irradiates a to-be-measured part inside a sample 3 fixed on the sample table. The X-ray detection system is configured to perform fixed-point measurement on intensity and distribution of a short-wavelength characteristic X-ray diffracted by the to-be-measured part inside the sample. The X-ray irradiation system includes a radiation source and the incident collimator 2. The incident collimator 2 is configured to limit a divergence of the X-ray beam incident on the sample 3, and limit a shape and a size of a cross-section of the X-ray beam. The radiation source includes a heavy metal target X-ray tube 1 with an atomic number greater than 55, a high-voltage power supply with a power supply voltage greater than 160 kv, and a controller. The X-ray detection system includes a receiving collimator 4 and an array detector 5 matched with the receiving collimator 4. The X-ray beam 7 is vertically incident on the X-ray detection system. The X-ray irradiation system, the sample table and the X-ray detection system are fixed on a same platform or a same support.

The array detector 5 is configured to detect and receive a diffraction ray 8 that is diffracted by a material of the to-be-measured part inside the sample and passes through a through hole 6 of the receiving collimator 4, and other stray rays passing through the through hole 6 of the receiving collimator 4. For the X-ray detection system, a central line of the incident X-ray beam 7 coincides with a central axis of the through hole 6, an extension line of an inner cone edge 61 of the through hole 6 interests with an extension line of an inner cone edge 62 of the through hole 6 at a point on the central line of the incident X-ray beam 7. The point is a center 9 of a diffractometer circle of the device. The to-be-measured part inside the sample is placed at the center 9 of the diffractometer circle of the device.

The X-ray irradiation system is an X-ray machine. An anode target of an X-ray tube of the X-ray irradiation system is made of a heavy metal material, such as tungsten, gold and uranium, with an atomic number greater than 46. The X-ray irradiation system emits a short-wavelength characteristic X-ray at a voltage ranging from 120 kv to 600 kv.

Each of detection pixels of the array detector 5 is configured to perform single-photon measurement, and the array detector 5 is a multi-energy array detector with two or more energy thresholds. Based on predetermined energy thresholds, each of the pixels can measure a short-wavelength characteristic X-ray. Alternatively, the array detector 5 may be an energy dispersive array detector, that is, each of pixels can measure multiple energy spectrums. Sizes of the pixels of the array detector 5 range from 0.02 mm to 0.2 mm. The array detector 5 is a cadmium telluride array detector, a cadmium zinc telluride array detector, or a gallium arsenide array detector.

A distance t from the center 9 of the diffractometer circle of the device to the array detector 5 ranges from 150 mm to 1500 mm.

A positioning hole 10 is defined in a central part of the receiving collimator 4. An axis of the positioning hole 10 coincides with the central line of the incident collimator 2. An X-ray absorber 11 is arranged in the positioning hole 10. The X-ray absorber 11 is configured to prevent the array detector 5 from being irradiated and damaged by the high-flux incident X-ray beam 7, and determine a position at which a maximum intensity of X-rays 12 are transmitted by detecting distribution of intensities of the incident X-ray 12 passing through the X-ray absorber 9, that is, determine a position of a center of a Debye ring of diffraction.

The incident collimator 2, the receiving collimator 4 and the shielding box 51 of the array detector 5 are made of heavy metal materials, such as tungsten, lead and gold, with sufficient thicknesses and having large atomic numbers for shielding X-rays from other directions, so that X-rays pass through the through hole 21 of the incident collimator 2, the through hole 6 of the receiving collimator 4, the positioning hole 10, and a receiving window of the shielding box 51 of the array detector 5, and then enter a detection region of the array detector 5.

The sample 3 is fixed on a translation table 31 of the sample table. The translation table 31 is fixed on a Φ angle turntable 32, and the Φ angle turntable 32 is fixed on a Ψ angle turntable 33. A rotation axis of the Φ angle turntable 32 and a rotation axis of the Ψ angle turntable 33 are perpendicular to each other and intersect at the center 9 of the diffractometer circle, so that the to-be-measured part inside the sample 3 is always located at the center 9 of the diffractometer circle without moving with the rotation of the Φ angle turntable or the Ψ angle turntable. The central line of the positioning hole 10 coincides with the central line of the incident collimator 2, and is parallel to a Z axis of the translation table 31 in a case of Ψ=0°.

In an embodiment, the through hole 21 of the incident collimator 2 is a circular hole or a rectangular hole. A length of the incident collimator 2 ranges from 20 mm to 200 mm. A divergence of the incident collimator 2 ranges from 0.02° to 05°. A length of the receiving collimator 4 ranges from 100 mm to 1200 mm. An angle between the inner cone edge 61 of the through hole 6 and the incident X-ray beam 7 is represented by γ, and γ ranges from 2° to 10°. An angle between the inner cone edge 61 of the through hole 6 and the inner cone edge 62 of the through hole 6 is represented by δ, and δ ranges from 0.5° to 6°. A sum of γ and δ is not greater than 12°.

Figure 9:
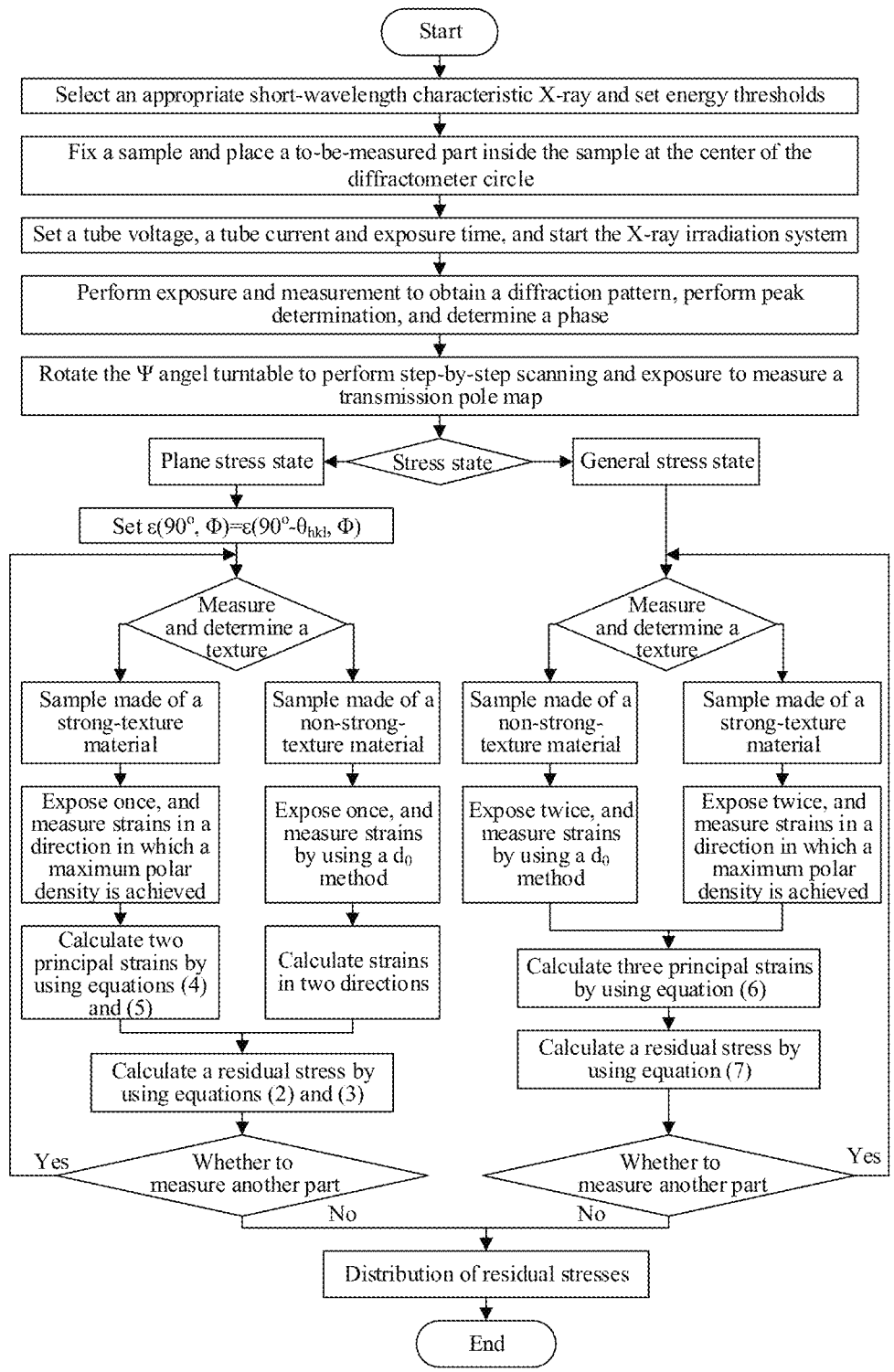
FIG. 9 is a block diagram showing measurement and calculation according to an embodiment of the present disclosure.

The device for measuring short-wavelength characteristic X-ray diffraction is controlled by a computer to move and perform measurement. The translation table 31, the Φ angle turntable 32 and the Ψ angle turntable 33 are all controlled by the computer to perform operations. Measurement and analysis are performed according to programs. The block diagram of involved measurement and control processes and calculation processes is shown in FIG. 9.

With the device for measuring short-wavelength characteristic X-ray diffraction, a Debye ring of diffraction of the to-be-measured part can be measured directly, and a diffraction pattern similar to a diffraction pattern taken by an X-ray diffraction flat panel camera is obtained.

Second Embodiment

A sample in this embodiment is a crystal material product with a thickness less than a maximum measurable thickness. For an iron product, the maximum measurable thickness is about 100 mm in a case that measurement is performed using Uk $\alpha_1$.

Based on the device for measuring diffraction according to the embodiments, the through hole 21 of the incident collimator 2 is a circular hole; the length of the incident collimator 2 ranges from 20 mm to 200 mm; the divergence of the incident collimator 2 ranges from 0.02° to 0.5°; the length of the receiving collimator 4 ranges from 100 mm to 1200 mm; the angle between the inner cone edge 61 of the through hole 6 and the incident X-ray beam 7 is represented by γ, and γ ranges from 2° to 10°; the angle between the inner cone edge 61 of the through hole 6 and the inner cone edge 62 of the through hole 6 is represented by δ, and δ ranges from 0.5° to 6°.

The measurement and analysis method according to this embodiment adopts a transmission method based on short-wavelength characteristic X-rays. The measurement and analysis method includes the following steps 1 to 7.

In step 1, a short-wavelength characteristic X-ray (for example, Wk $\alpha_1$ radiated by a tungsten target X-ray tube or Uk $\alpha_1$ radiated by a uranium target X-ray tube) with an appropriate wavelength is selected based on a material and a thickness of the sample. Two energy thresholds of the array detector 5 are set, so that each of the pixels of the array detector detects the selected short-wavelength characteristic X-ray, such as Wk $\alpha_1$ or Uk $\alpha_1$.

In step 2, the sample 3 is fixed on the sample table, and the to-be-measured part inside the sample is placed at the center of the diffractometer circle with an X-Y-Z translation system under control of a computer.

In step 3, a tube voltage greater than 1.5 times a target excitation voltage is applied based on the selected short-wavelength characteristic X-ray to start the X-ray irradiation system.

In step 4, under the control of the computer, a Debye ring of diffraction of a crystal material of the to-be-measured part is exposed and measured, peak determination is performed, and the Debye ring is compared with a powder diffraction file to determine a phase of the crystal material of the to-be-measured part.

In step 5, for measuring a texture of a main phase of the to-be-measured part, measurement and analysis are performed under the control of the computer. The ψ angle turntable is rotated to perform step-by-step scanning and measurement, and Debye rings of diffraction of the crystal material of the to-be-measured part are exposed and measured at different Ψ angles. Peak determination is performed. For each of diffraction crystal planes, diffraction intensities of a Debye ring in the crystal plane in different directions are measured. Absorption correction is performed based on a diffraction path length to obtain, for each of the diffraction crystal planes, corrected diffraction intensities of the Debye ring in the diffraction crystal plane in different directions. Thus, transmission pole maps of the main phase in multiple strong diffraction crystal planes and relatively strong diffraction crystal planes are calculated. The transmission pole maps of the main phase in multiple strong diffraction crystal planes are selected according to a crystal system type to calculated a full pole map or an orientation distribution function (ODF) of the multiple strong diffraction crystal planes.

It should be noted that different crystal systems lead to different symmetries. For a crystal system with higher symmetry, a less number of transmission pole maps are required in calculating the full pole figure or the orientation distribution function (ODF) of the corresponding diffraction crystal planes, that is, a less number of diffraction crystal planes (Debye rings) of the main phase are required to be calculated in measuring the Debye rings of the diffraction of the crystal material of the to-be-measured part at different θ. For example, for an fcc crystal system, it is only required to measure transmission pole maps of three strong diffraction crystal planes in calculating the full pole map or the orientation distribution function (ODF). For example, it is only required to measure transmission pole maps of three strong lines of crystal planes 111, 200 and 220 to calculate the full pole map or the orientation distribution function (ODF) of the diffraction crystal planes.

In step 6, for measuring a residual stress of the to-be-measured part, measurement and analysis are performed under the control of the computer.

(1) Measurement of a Residual Stress of a Sample Made of a Non-Strong-Texture Material (a) For a sample in a plane stress state, the sample and a stress-free standard sample are rotated by rotating the Ψ angle turntable, so that a surface normal direction of the to-be-measured part inside the sample and a surface normal direction of a corresponding part of the stress-free standard sample coincide with the incident beam 7. A Debye ring of diffraction of the to-be-measured part inside the sample in each of crystal planes of the to-be-measured part is exposed and measured and a Debye ring of diffraction of a corresponding part of the stress-free standard sample in each of crystal planes of the corresponding part is exposed and measured. Peak determination is performed to obtain, for each of the crystal planes of the to-be-measured part inside the sample, diffraction angles $2\theta_{s-hkl}$ of the to-be-measured part in the crystal plane in different directions and obtain, for each of the crystal planes of the corresponding part of the stress-free standard sample, diffraction angles $2\theta_{0-hkl}$ of the corresponding part in the crystal plane in different directions. For a (hkl) crystal plane, such as crystal plane Al (111), a strain $\varepsilon(90°-\theta_h m, \Phi)$ at an angle of $90°-\theta_h u$ with the surface normal of the to-be-measured part inside the sample, and strains in all directions of a (hkl) crystal plane obtained by encircling the surface normal of the to-be-measured part inside the sample and distribution of the strains are calculated by using the following equation (1):

$$\varepsilon = \frac{d_{s-hkl} - d_{0-hkl}}{d_{0-hkl}} = \frac{\Delta d_{hkl}}{d_{0-hkl}} = \frac{\sin\theta_{0-hkl}}{\sin\theta_{s-hkl}} - 1 \tag{1}$$

The wavelength of the short-wavelength characteristic X-ray is about 0.02 nm, and a diffraction angle 2θ of a strong diffraction crystal plane or a relatively strong diffraction crystal plane of most substances is less than 11°, that is, $\theta_{hkl}$<5.5°. In a case that the selected short-wavelength characteristic X-ray is Wk α$_1$, for the crystal plane Al(111), the diffraction angle $2\theta_{111}$≈5.12°, and $\theta_{111}$≈2.56°. Therefore, in each of the directions of the (hkl) crystal plane, a difference between the calculated strain $\varepsilon(90°-\theta_{hkl}, \Phi)$ in the direction and a strain $\varepsilon(90°, \Phi)$ of the (hkl) crystal plane in a direction perpendicular to the direction of the surface of the to-be-measured part inside the sample is small, that is, less than 5.5°, so that the strains may be regarded as equal to each other (0°≤Φ≤180°), that is, $\varepsilon(90°, \Phi)=\varepsilon(90°-\theta_{hkl}, \Phi)$.

According to a stress-strain relationship of a plane stress problem in elastic mechanics, in an xy plane, it is assumed that an X-axis and a Y-axis respectively represent a principal stress direction, and a strain $\varepsilon_{xx}$, that is $\varepsilon(90°-\theta_{hkl}, 90°)$, in a direction of the X-axis, and a strain $\varepsilon_{yy}$, that is $\varepsilon(90°-\theta_{hkl}, 0°)$, in a direction of the Y-axis are measured. Then, two principal stresses $\sigma_{xx}$ and $\sigma_{yy}$ are calculated by using the following equations:

$$\sigma_{xx} = \frac{E_{hkl}}{1 + v_{hkl}^2}(\varepsilon_{xx} + v_{hkl}\varepsilon_{yy}) \tag{2}$$

$$\sigma_{yy} = \frac{E_{hkl}}{1 + v_{hkl}^2}(\varepsilon_{yy} + v_{hkl}\varepsilon_{xx}). \tag{3}$$

where $E_{hkl}$ represents an elastic modulus of a (hkl) crystal plane, and $v_{hkl}$ represents a Poisson ratio of the (hkl) crystal plane.

Based on the obtained strains $\varepsilon(90°-\theta_{hkl}, 90°)$ and $\varepsilon(90°-\theta_{hkl}, 0°)$ of the (hkl) crystal plane, such as the crystal plane Al(111), in directions of the two principal stresses, two principal stresses $\sigma_{xx}$ and $\sigma_{yy}$ in a direction perpendicular to the surface normal of the to-be-measured part inside the sample, that is, a plane stress tensor σ of the to-be-measured part inside the sample, are calculated by using the equations (2) and (3).

In a case that the directions of the two principal stresses are unknown, according to the theory of elasticity, it is only required to measure strains in three directions to obtain magnitudes and directions of two principal stresses and one shear stress, that is, the plane stress tensor a of the to-be-measured part inside the sample.

Figure 7:
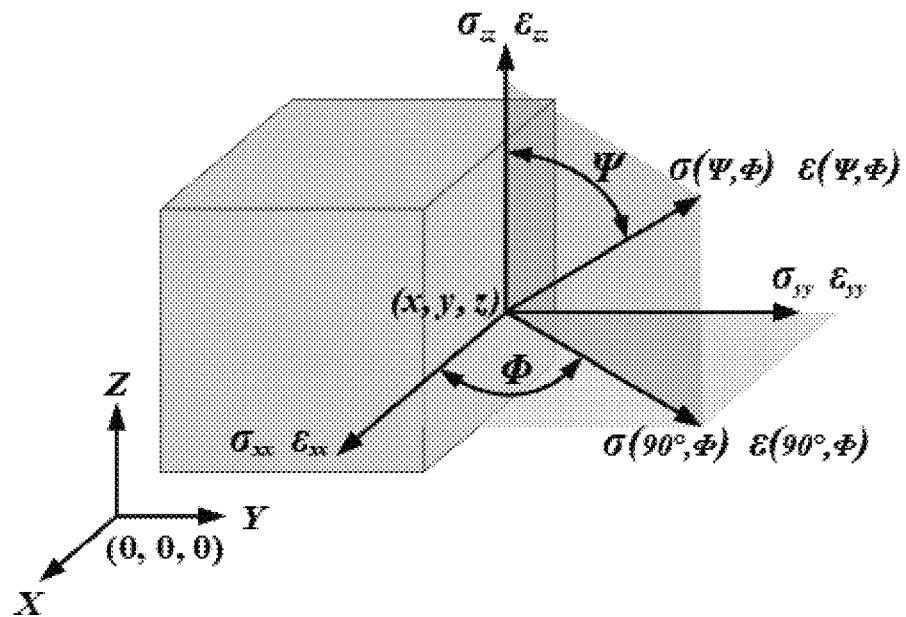
FIG. 7 is a schematic diagram showing an orientation coordinate system of a (hkl) crystal plane measured in a sample.
Figure 8:
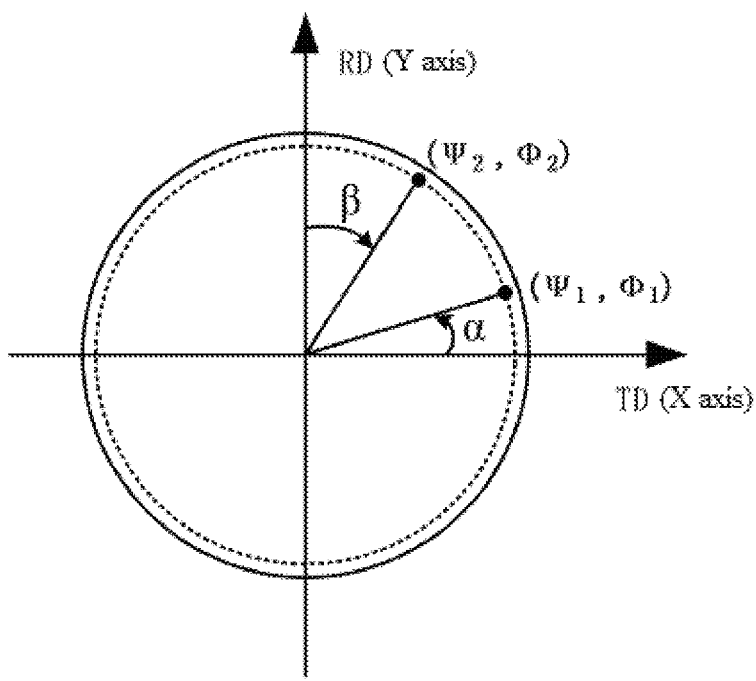
FIG. 8 shows orientations of a measured (hkl) crystal plane in a sample in a pole map.

It should be noted that, as shown in FIG. 7 and FIG. 8, (ψ, φ) are coordinates on a pole map of a (hkl) crystal plane and represent a crystal orientation. The X-axis is perpendicular to the Y-axis. Taking a rolled plate as an example, (90°, 0°) represents a rolling direction RD (often defined as coinciding with the Y-axis), (90°, 90°) represents a transverse direction TD (often defined as coinciding with the X-axis), Ψ represents an angle deviating from a normal direction ND (often defined as coinciding with the Z-axis), and it is apparent that 0°≤ψ≤90°. φ represents an angle formed by rotating counterclockwise with the ND direction (Z-axis) and starting from the RD (Y-axis).

In a case that Debye rings in multiple strong diffraction crystal planes and relatively strong diffraction (hkl) crystal planes are measured, strains $\varepsilon(90°-\theta_{hkl}, \phi)$ and distribution of the strains $\varepsilon(90°-\theta_{hkl}, \phi)$ of the multiple strong diffraction crystal planes and relatively strong diffraction (hkl) crystal planes may be calculated. Then, multiple stress tensors a may be calculated based on the obtained $\varepsilon(90°-\theta_{hkl}, \phi)$ and distributions of $\varepsilon(90°-\theta_{hkl}, \phi)$ of the multiple strong diffraction crystal planes and relatively strong diffraction (hkl) crystal planes. An accurate stress tensor $\overline{\sigma}$ is obtained by performing average calculation, that is, the stress tensor $\overline{\sigma}$ may be obtained by exposing and measuring the to-be-measured part inside the sample and the corresponding part of the stress-free standard sample once.

(b) For a sample made of a strong-texture material, a direction in which a strain is measured is determined based on the texture. A strong diffractive (hkl) crystal plane to be measured is determined. A maximum diffraction intensity (a large polar density or a strong diffraction spot) is obtained on an outermost circle in a pole map of the (hkl) crystal plane and is in directions of two principal stresses $\varepsilon_{xx}$ and $\varepsilon_{yy}$ or near the directions of the two principal stresses.

Figure 10:
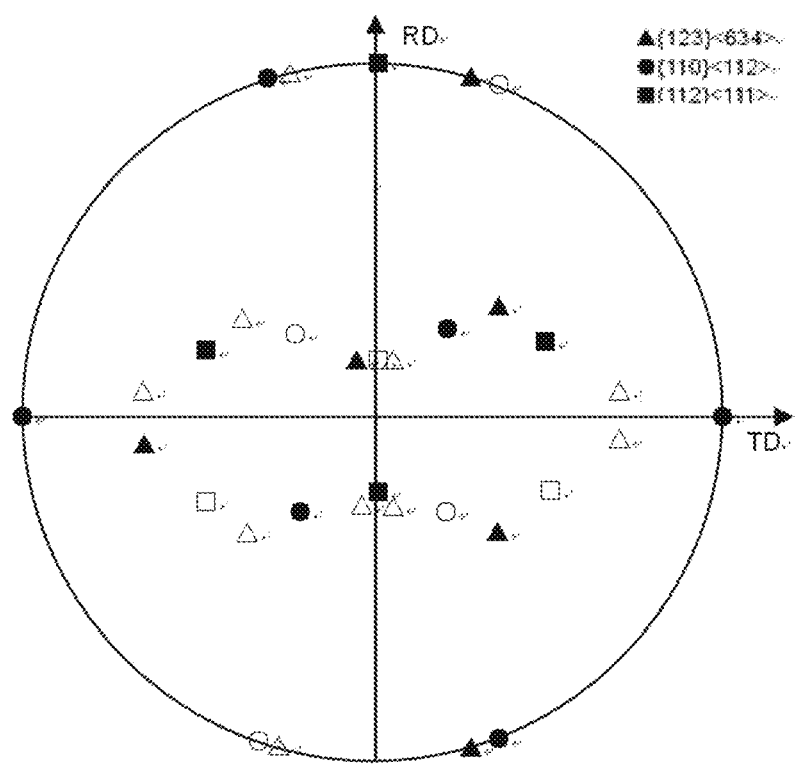
FIG. 10 is a pole map of a typical texture {111} of a rolled aluminum plate.

The sample is rotated by rotating the Ψ angle turntable, so that a surface normal direction of the to-be-measured part inside the sample and a surface normal direction of the corresponding part of the stress-free standard sample coincide with the incident beam 7. A Debye ring of diffraction of the to-be-measured part inside the sample in each of crystal planes of the to-be-measured part is exposed and measured and a Debye ring of diffraction of a corresponding part of the stress-free standard sample in each of crystal planes of the corresponding part is exposed and measured. Peak determination is performed on strong diffraction spots of the Debye rings to determine an angle α and an angle β. The angle α represents an angle by which deviating from the X-axis to obtain a maximum polar density. The angle β represents an angle by which deviating from the Y-axis to obtain a maximum polar density. For example, the directions of the maximum polar density may be the transverse direction (TD) and a direction deviating from the rolling direction (RD) by 20°, such as α=0° and β=20°, on the outmost circle of the pole map of a rolled aluminum plate Al(111), as shown in FIG. 10.

Strains $\varepsilon(90°-\theta_{hkl}, 90°+a)$ and $\varepsilon(90°-\theta_{hkl}, \beta)$ are measured in the way described in (a). Similarly, since $\theta_{hkl}<5.5°$, that is, $\varepsilon(90°, \phi)=\varepsilon(90°-\theta_{hkl}, \phi)$, the measured strain $\varepsilon(90°-\theta_{hkl}, 90°+\alpha)$ is recorded as $\varepsilon_\alpha$, the measured strain $\varepsilon(90°-\theta_{hkl}, \beta)$ is recorded as $\varepsilon_\beta$, and $\varepsilon_\alpha$ and $\varepsilon_\beta$ are substituted into the following equations:

$$\varepsilon_{xx} = \frac{\varepsilon_\alpha \cos^2\beta - \varepsilon_\beta \sin^2\alpha}{\cos^2\alpha \cos^2\beta - \sin^2\alpha \sin^2\beta} \quad (4)$$

$$\varepsilon_{yy} = \frac{\varepsilon_\beta \cos^2\alpha - \varepsilon_\alpha \sin^2\beta}{\cos^2\alpha \cos^2\beta - \sin^2\alpha \sin^2\beta} \quad (5)$$

then the principal strains $\varepsilon_{xx}$ and $\varepsilon_{yy}$ in directions of the two principal stresses $\sigma_{xx}$ and $\sigma_{yy}$ are calculated, and then $\varepsilon_{xx}$ and $\varepsilon_{yy}$ are substituted into equations (2) and (3) to obtain the two principal stresses $\sigma_{xx}$ and $\sigma_{yy}$, that is, a stress tensor σ of the to-be-measured part inside the sample.

Therefore, for a sample in the plane stress state, the sample 3 is rotated by rotating the Ψ angle turntable, so that the surface normal of the to-be-measured part inside the sample coincides with the incident beam 7, that is, the incident beam is perpendicular to the sample 3. A Debye ring of the diffraction of the to-be-measured part inside the sample in each of crystal planes of the to-be-measured part is exposed and measured once and a Debye ring of diffraction of a corresponding part of a stress-free standard sample in each of crystal planes of the corresponding part is exposed and measured once. The plane stress tensor σ of the to-be-measured part inside the sample perpendicular to the surface normal of the to-be-measured part inside the sample is calculated by using the equations (2) and (3).

(2) For a sample in a general stress state, a strong diffraction plane or a relatively strong diffraction plane is selected as a to-be-measured diffraction plane. Strains in at least six directions (ψ, φ) are required to be measured. The six ψ angles should not all be the same, and differences between the six φ angles should be as large as possible.

(a) For a sample made of a non-strong-texture material, the sample is rotated to a position at which $\psi=\psi_1$. A Debye ring of the diffraction of the to-be-measured part inside the sample in each of crystal planes of the to-be-measured part is exposed and measured and a Debye ring of diffraction of a corresponding part of the stress-free standard sample in each of crystal planes of the corresponding part is exposed and measured. Then, the sample is rotated to a position at which $\psi=\Psi_2$, where a difference between $\psi_1$ and $\psi_2$ is as large as possible. A Debye ring of the to-be-measured part inside the sample in each of crystal planes of the to-be-measured part is exposed and measured and a Debye ring of diffraction of a corresponding part of the stress-free standard sample in each of crystal planes of the corresponding part is exposed and measured. Peak determination is performed. Peak determination results 2 $\theta_{s-hkl}$ and 2 $\theta_{0-hkl}$ of the (hkl) crystal plane in six directions are selected. Strains $\varepsilon(\psi_i, \phi_i)$ of the (hkl) crystal plane in six directions $(\psi_i, \theta_i)$ are calculated by using the equation (1).

$$\varepsilon(\Psi_i,\Phi_i)=a_i^2\varepsilon_{xx}+b_i^2\varepsilon_{yy}+c_i^2\varepsilon_{yy}+2a_ib_i\varepsilon_{xy}+2b_ic_i\varepsilon_{yz}+2c_ia_i\varepsilon_{zx} \quad (6)$$

where $a_i$ represents a direction cosine of the strain $\varepsilon(\psi_i, \theta_i)$ in the X-axis, $b_i$ represents a direction cosine of the strain $\varepsilon(\psi_i, \phi_i)$ in the Y-axis, $c_i$ represents a direction cosine of the strain $\varepsilon(\psi_i, \theta_i)$ in the Z-axis, $a_i=\sin\psi_i\cos\phi_i$, $b_i=\sin\psi_i\sin\phi_i$, and $c_i=\cos\phi_i$.

The measured strains $\varepsilon(\psi_i, \phi_i)$ in six directions and the direction cosines of the strains are substituted into the equation (6) to solve the linear equations simultaneously to obtain a strain $\varepsilon_{ij}$(i=x,y,z; j=x,y,z). Then, linear transformation is performed on $\varepsilon_{ij}$ to obtain three principal strains $\varepsilon^D_{xx}$, $\varepsilon^D_{yy}$ and $\varepsilon^D_{zz}$. A stress tensor a of the to-be-measured part inside the sample or magnitudes and directions of three principal stresses $\sigma^D_{xx}$, $\sigma^D_{yy}$, and $\sigma^D_{zz}$ are calculated by using the following equation (7):

$$\begin{bmatrix} \sigma^D_{XX} \\ & \sigma^D_{YY} \\ & & \sigma^D_{ZZ} \end{bmatrix} = \frac{E}{(1+v)}\begin{bmatrix} \varepsilon^D_{XX} \\ & \varepsilon^D_{YY} \\ & & \varepsilon^D_{ZZ} \end{bmatrix} + \frac{vE}{((1-2v)(1+v))}\left(\varepsilon^D_{XX}+\varepsilon^D_{YY}+\varepsilon^D_{ZZ}\right)\begin{bmatrix} 1 \\ & 1 \\ & & 1 \end{bmatrix} \quad (7)$$

where E represents an elastic modulus of the (hkl) crystal plane, and v represents a Poisson ratio of the (hkl) crystal plane.

Apparently, in a case that the directions of the three principal stresses $\sigma^D_{xx}$, $\sigma^D_{yy}$ and $\sigma^D_{zz}$ are known, it is only required to measure strains in three directions $(\psi_i, \phi_i)$ to obtain the stress tensor σ of the to-be-measured part inside the sample. It is only required to expose and measure the to-be-measured part inside the sample twice and expose and measure the corresponding part of the stress-free standard sample twice to obtain the stress tensor σ.

Furthermore, Debye rings of multiple strong diffraction crystal planes and relatively strong diffraction (hkl) crystal planes are measured, so that multiple $\varepsilon(\psi_i, \theta_i)$ may be calculated and multiple stress tensors a may be obtained. An accurate stress tensor $\bar{\sigma}$ is obtained by performing an average operation, that is, the accurate stress tensor $\bar{\sigma}$ may be obtained by exposing and measuring the to-be-measured part inside the sample twice and exposing and measuring the corresponding part of the stress-free standard sample twice.

(b) In measuring a residual stress of a sample made of a strong-texture material, the direction in which the strain is measured is determined based on the texture. It is required to select a direction in which a maximum diffraction intensity (a large polar density or a strong diffraction spot) of the to-be-measured strong diffraction (hkl) crystal plane is obtained to measure the strain.

The ψ angle turntable is rotated, thus Debye rings of diffraction of the to-be-measured part inside the sample at different ψ angles and Debye rings of diffraction of the corresponding part of the stress-free standard sample are measured. Directions in which six strong diffraction spots, that is six maximum diffraction intensities, of the strong diffraction crystal plane and relatively strong diffraction (hkl) crystal plane are determined. Peak determination is performed. Strains $\varepsilon(\psi_i, \phi_i)$ in the six directions are calculated, and linear transformation is performed to obtain three principal strains $\varepsilon^D_{xx}$, $\varepsilon^D_{yy}$ and $\varepsilon^D_{zz}$. A stress tensor $\sigma$ or magnitudes and directions of three principal stresses $\varepsilon^D_{xx}$, $\varepsilon^D_{yy}$ and $\varepsilon^D_{zz}$ of the to-be-measured part inside the sample are calculated by using the elastic mechanics equation (7).

It should be noted that the strains obtained in the six directions may not correspond to a same crystal plane family $\{h_1 k_1 l_1\}$, that is, strains in some directions are measured based on crystal planes $(h_1 k_1 l_1)$ and strains in other directions are measured based on crystal planes $(h_2 k_2 l_2)$. In the equations for calculating stresses based on measured strains, the elastic modulus $E_{hkl}$ and the Poisson ratio $v_{hkl}$ corresponding to the measured strains are used.

In step 7, for measuring phases, textures and stresses in other parts of the sample, steps 4, 5, and 6 are performed repeatedly until all the other to-be-measured parts are measured. A computer performs data processing to obtain the phases, the textures, the stresses, and distributions of the stresses of all the other to-be-measured parts of the sample.

Third Embodiment

A sample in this embodiment is a crystal material product with a thickness less than a maximum measurable thickness. For an aluminum product, the maximum measurable thickness is about 40 mm in a case that measurement is performed using WK $\alpha_1$. The device used in this embodiment is almost the same as the device used in the first embodiment, and the differences are described as follows.

The X-ray irradiation system and the X-ray detection system are fixed on the $\psi$ angle turntable 33. The $\psi$ angle turntable 33 and a sample table including the translation table 31 and the $\Phi$ angle turntable 32 are fixed on a platform. The sample 3 is fixed on the translation table 31 of the sample table, and the translation table 31 is fixed on the $\Phi$ angle turntable 32. The $\Phi$ angle turntable 32 is fixed on the platform. The rotation axis of the $\Phi$ angle turntable 32 and a rotation axis of the $\Psi$ angle turntable 33 are perpendicular to each other and intersect at the center 9 of the diffractometer circle, so that the to-be-measured part inside the sample 3 is always located at the center 9 of the diffractometer circle without moving with the rotation of the $\Phi$ angle turntable or the $\Psi$ angle turntable.

The measurement and analysis method according to this embodiment refer to the method according to the second embodiment.

Fourth Embodiment

A sample in this embodiment is a rolled aluminum plate with a thickness of 20 mm and a size of 200 mm in RD*200 mm in TD. The rolled aluminum plate is in a plane stress state. A direction of a principal stress of the rolled aluminum plate is the rolling direction RD, and a direction of a principal strain of the rolled aluminum plate is a transverse direction TD. The diffraction crystal plane is a crystal plane Al (111). FIG. 10 is a pole map of a typical texture {111} of the rolled aluminum plate. In the outermost circle of the pole map, referring to the strain direction and the stress direction shown in FIG. 7 and FIG. 8, $\alpha=0°$ or $\alpha=180°$ in directions of (90°, 90°) and (90°, 270°) as shown in FIG. 10. That is, the crystal plane Al(111) has a maximum diffraction intensity in the transverse direction. In addition, the crystal plane Al(111) has maximum diffraction intensities in directions of (90°, −18.5°), (90°, 18.5°), (90°, 161.5°), and (90°, 198.5°), that is, in the directions deviating from the rolling direction by 18.5°.

The device and the method according to this embodiment refer to the device and the method in the first embodiment, and the difference is in the configurations of the parameters which are described as follows.

The device for measuring diffraction includes an X-ray irradiation system, a sample table, and an X-ray detection system. The X-ray irradiation system includes a 225 KV reflective tungsten target X-ray machine 1 and the incident collimator 2. The sample table includes the translation table 31, the $\phi$ angle turntable 32, and the $\psi$ angle turntable 33. The X-ray detection system includes the receiving collimator 4, the array detector 5, and the shielding box 51 of the array detector. The device is controlled by a computer program to perform measurement and analysis. The X-ray irradiation system, the sample table and the X-ray detection system are fixed on a platform or a support.

The incident X-ray beam 7 is vertically incident on the X-ray detection system. The array detector 5 detects and receives the diffraction ray 8 that is diffracted by the material of the to-be-measured part inside the sample and passes through an annular through hole 6 of the receiving collimator 4. Scattered rays from other directions are shielded by the receiving collimator 4 and the shielding box 51 of the array detector 5. The central line of the incident X-ray 7 coincides with the central axis of the annular through hole 6. The extension line of the inner cone edge 61 of the through hole 6 interests with the extension line of the inner cone edge 62 of the through hole 6 at a point on the central line of the incident X-ray beam 7. The point is the center 9 of the diffractometer circle of the device. The to-be-measured part inside the sample 3 is placed at the center 9 of the diffractometer circle of the device.

The sample 3 is fixed on the translation table 31 of the sample table. The translation table 31 is fixed on the $\Phi$ angle turntable 32, and the $\Phi$ angle turntable 32 is fixed on the $\Psi$ angle turntable 33. The $\Psi$ angle turntable 33 is fixed on the platform. The rotation axis of the $\Phi$ angle turntable 32 and the rotation axis of the $\Psi$ angle turntable 33 are perpendicular to each other and intersect at the center 9 of the diffractometer circle, so that the to-be-measured part inside the sample 3 is always located at the center 9 of the diffractometer circle without moving with rotation of the $\phi$ angle turntable or the $\psi$ angle turntable.

The array detector 5 is a cadmium telluride array detector with a thickness of 2 mm, and each of detection pixels of the array detector 5 has a size of 0.1 mm*0.1 mm. Each of the detection pixels performs single-photon measurement. The array detector 5 may be a dual-energy array detector with two energy thresholds, and each of pixels can measure a diffracted X-ray having a Wk $\alpha_1$ feature.

The length of the incident collimator 2 is 100 mm. The cross section of the through hole 21 of the incident collimator 2 is a square through hole having a side length of 0.2 mm. The divergence of the incident collimator 2 is 0.45°.

The length of the receiving collimator 4 is 200 mm, and the cross section of the through hole 6 of the receiving collimator 4 is an annular through hole. A half-apex angle of the inner cone edge 61 is represented by $\gamma$, that is, the angle between the inner cone edge 61 and the incident X-ray beam 7 is represented by $\gamma$, where $\gamma$ is equal to 4.5°. The angle between the inner cone edge 61 and the inner cone edge 62 of the through hole 6 is represented by $\delta$, where $\delta$ is equal to 1.5°. Radiuses of an annular hole, near a thin end of the receiving collimator 4 and near the sample 3, are respectively equal to 3.93 mm and 5.25 mm. Radiuses of an annular hole at a butt end of the receiving collimator 4 installed on the array detector 5 are respectively equal to 19.67 mm and 26.28 mm. A distance between the to-be-measured part inside the sample 3 and the thin end of the receiving collimator 4, that is a distance between the center 9 of the diffractometer circle and the thin end of the receiving collimator 4, is equal to 50 mm. The distance between the center 9 of the diffractometer circle and the array detector 5 is equal to 250 mm.

A circular positioning hole 10 with a diameter of 1 mm is defined in the central part of the receiving collimator 4. An axis of the positioning hole 10 coincides with the central line of the through hole 21 of the incident collimator 2. The X-ray absorber 11 is arranged in the positioning hole 10. The X-ray absorber 11 is configured to prevent the array detector 5 from being irradiated and damaged by the high-throughput incident X-ray beam 7, and determine the position at which a maximum intensity of the X-rays 12 are transmitted by detecting distribution of intensities of the incident X-ray passing through the X-ray absorber 11, that is, determine a position of a center of a Debye ring of diffraction.

The incident collimator 2, the receiving collimator 4 and the shielding box 51 of the array detector 5 are made of heavy metal materials, such as tungsten, lead and gold, with sufficient thicknesses for shielding stray X-rays from other parts and other directions, so that the diffraction rays 8 pass through the through hole 21 of the incident collimator 2, the through hole 6 of the receiving collimator 4, the positioning hole 10, and the receiving window of the shielding box of the array detector 5, and then enter the detection region of the array detector 5.

The measurement and analysis method in this embodiment includes the following steps 1 to 7.

In step 1, a rolled aluminum plate, with a size of 200 mm*200 mm and a thickness of 20 mm, is selected as a sample. A short-wavelength characteristic X-ray Wk α is selected by setting an upper threshold and a lower threshold of energy of detection photons to be 55 keV and 61 keV respectively. Pixels of the array detector detect Wk α. Due to coarse grains of the rolled aluminum plate, the number of crystal grains involved in diffraction is increased by using a rocking method in exposing and measuring a diffraction pattern to suppress the influence of the coarse grains on the measurement.

In step 2, the rolled aluminum plate, with a size of 200 mm in RD direction*200 mm in TD direction and a thickness of 20 mm, is fixed on the sample table, so that an incident ray is vertically incident on the aluminum plate. The TD direction is parallel to the X-axis, and the RD direction is parallel to the Y-axis. A to-be-measured part inside the sample is placed at the center of the diffractometer circle with an X-Y-Z translation system.

In step 3, a tube voltage is set to be 200 Kv and a tube current is set to be 4 mA to start the X-ray irradiation system.

In step 4, measurement and analysis are performed under control of a computer. The sample is exposed for 100 s for measurement. A Debye ring of diffraction of a crystal material of the to-be-measured part is obtained. Peak determination is performed. The Debye ring is compared with a powder diffraction file to determine that the Debye ring of the crystal material of the to-be-measured part belongs to Al111 having a main phase of an f.c.c. crystal system.

In step 5, measurement and analysis are performed under the control of the computer. The ψ angle turntable is rotated to perform step-by-step scanning and measurement. Debye rings of diffraction of the crystal material of the to-be-measured part are exposed for 200 s to perform measurement at different Ψ angles. Peak determination is performed. For each of diffraction crystal planes, diffraction intensities of a Debye ring in the crystal plane in different directions are measured. After measurement, the texture of the material of the to-be-measured part is determined as a rolling texture.

In step 6, measurement and analysis are performed under the control of the computer, and a residual stress in the strong-texture rolled aluminum plate in a plane stress state is measured. Directions of principal stresses are the rolling direction RD and the transverse direction TD. Two principal stresses may be calculated based on strains measured in two directions. Since $\theta_{111} \approx 2.56°$, in each of the directions of the crystal plane, a difference between a strain $\varepsilon(90°-\theta_{111}, \phi)$ of the crystal plane Al(111) in the direction and a strain E (90°, $\phi$) of the crystal plane 111 in a direction perpendicular to the direction of the surface of the to-be-measured part inside the sample is small, that is, it may be regarded that $\varepsilon(90°, \phi) = \varepsilon(90°-\theta_{111}, \phi)$. Therefore, the two principal stresses may be obtained by measuring strains in two directions $(90°-\theta_{111}, \phi)$, which includes the following steps a to d.

In step a, the to-be-measured part inside the sample is translated to the center 9 of the diffractometer circle by moving the translation table 31, and then the sample is moved to a position at which ψ=0° by rotating the ψ turntable, so that the incident X-ray beam 7 is vertically incident on the sample and pass through the to-be-measured part inside the sample. The sample is exposed for 200 s, and a Debye ring of diffraction in the crystal plane Al(111) is measured. On the measured Debye ring of the diffraction in the crystal plane Al(111), there are six directions in which maximum diffraction intensities are achieved, including two directions of $(90°-\theta_{111}, 90°)$ and $(90°-\theta_{111}, 270°)$ near the transverse direction TD and α=0°, and four directions of $(90°-\theta_{111}, -\beta)$, $(90°-\theta_{111}, \beta)$, $(90°-\theta_{111}, 180°-\beta)$ and $(90°-\theta_{111}, 180°+\beta)$ near the rolling direction RD and β=18.5°. Peak determination is performed. 2 $\theta_{s\text{-}111TD\alpha}$ of the to-be-measured part inside the sample in two directions deviating from the transverse direction TD by a and 2 $\theta_{s\text{-}111RD\beta}$ of the to-be-measured part inside the sample in four directions deviating from the rolling direction RD by β are obtained.

In step b, a corresponding part of a stress-free standard sample is translated to the center of the diffractometer circle by moving the translation table, and then the sample is moved to a position at which ψ=0° by rotating the ψ turntable, so that the incident X-ray beam 7 is vertically incident on the stress-free standard sample and pass through the corresponding part of the stress-free standard sample. The stress-free standard sample is exposed for 200 s and measurement is performed. 2 $\theta_{0\text{-}111TD\alpha}$ of the corresponding part of the stress-free standard sample in two directions deviating from the transverse direction TD by α and $2\theta_{0\text{-}111RD\beta}$ of the corresponding part of the stress-free standard sample in four directions deviating from the rolling direction RD by β are obtained by performing measurement and calculation.

In step c, a peak determination result 2 $\theta_{s\text{-}111TD\alpha}$ in a direction deviating from the transverse direction TD by a is selected from the peak determination results of the to-be-measured part inside the sample and a peak determination result 2 $\theta_{s\text{-}111RD\beta}$ in a direction deviating from the rolling direction RD by β is selected from the peak determination results of the to-be-measured part inside the sample, and a peak determination result 2 $\theta_{0\text{-}111TD\alpha}$ in a direction deviating from the transverse direction TD by α and a peak determination result $2\theta_{0\text{-}111RD\beta}$ in a direction deviating from the rolling direction RD by β are selected from the peak determination results of the corresponding part of the stress-free standard sample. Alternatively, an arithmetic mean of peak determination results of the to-be-measured part inside the sample in the two directions deviating from the transverse direction TD by α and an arithmetic mean of peak determination results of the to-be-measured part inside the sample in the four directions deviating from the rolling direction RD by β are calculated. An arithmetic mean of peak determination results of the certain part of the stress-free standard sample in the two directions deviating from the transverse direction TD by a and an arithmetic mean of peak determination results of the corresponding part of the stress-free standard sample in the four directions deviating from the rolling direction RD by β are calculated. A strain $\varepsilon_\alpha=\varepsilon(90°-\theta_{111}, 90°)$ of the to-be-measured part inside the sample in the direction deviating from the transverse direction TD by a and α strain $\varepsilon_\beta=\varepsilon(90°-\theta_{111}, 18.5°)$ of the to-be-measured part inside the sample in the direction deviating from the rolling direction RD by β are calculated by using the following equation (1):

$$\varepsilon=(\sin\theta_{0\text{-}111}/\sin\theta_{s\text{-}111})-1 \qquad (1)$$

where α=0° and β=18.5°.

In step d, the measured strains $\varepsilon_\alpha$ and $\varepsilon_\beta$, α=0° and β=18.5° are substituted into equations (4) and (5) to obtain two principal strains $\varepsilon_{xx}$ and $\varepsilon_{yy}$ of the to-be-measured part inside the sample. $\varepsilon_{xx}$ and $\varepsilon_{yy}$ are substituted into equations (2) and (3) to obtain two principal stresses a $\sigma_{xx}$ and $\sigma_{yy}$, that is $\sigma_{TD}$ and $\sigma_{RD}$, of the to-be-measured part inside the sample, thus a stress tensor σ of the to-be-measured part inside the sample is obtained.

In step 7, for measuring stresses of other parts of the aluminum plate sample, steps a, b, c, and d are repeatedly performed until all the other to-be-measured parts are measured. In this way, stresses in the aluminum plate sample and distributions of the stresses are obtained.

Fifth Embodiment

A sample in this embodiment is a directionally crystallized nickel base superalloy with a thickness of 6 mm and a size of 100 mm*15 mm. The device used in this embodiment is the same as the device used in the third embodiment, and the differences are described as follows.

(1) A 225 KV reflective gold target X-ray machine 1 is used as a radiation source to measure a diffraction pattern of Auk α.

(2) The length of the incident collimator 2 is 50 mm. The cross section of the through hole 21 of the incident collimator 2 is a circular through hole with a diameter of 0.05 mm. The divergence of the incident collimator 2 is 0.11°.

(3) The array detector 5 is a GaAs array detector with a thickness of 3 mm. Each of detection pixels of the array detector 5 has a size of 0.055 mm*0.055 mm, and each of the detection pixels performs single-photon measurement. The array detector 5 is a dual-energy array detector with two energy thresholds. Each of the pixels can measure a diffracted Auk α X-ray.

(4) The length of the receiving collimator 4 is 300 mm. The cross section of the through hole 6 of the receiving collimator 4 is an annular through hole. The half vertex angle of the inner cone edge 61 is represented by γ, that is, the angle between the inner cone edge 61 and the incident X-ray beam 7 represented by γ, where γ is equal to 3.5°. The angle δ between the inner cone edge 61 and the inner cone edge 62 of the through hole 6 is equal to 4.0°. The radiuses of the annular hole at the thin end, near the sample 3, of the receiving collimator 4 are 6.1 mm and 13.2 mm. The radiuses of the annular hole at the thick end, installed on the array detector 5, of the receiving collimator 4 are 24.5 mm and 52.7 mm. The distance between the to-be-measured part inside the sample 3 and the thin end of the receiving collimator 4, that is the distance between the center 9 of the diffractometer circle and the thin end of the receiving collimator 4, is 100 mm. The distance between the center 9 of the diffractometer circle and the array detector 5 is 400 mm.

(5) A circular positioning hole 10 with a diameter of 2 mm is defined in the central part of the receiving collimator 4. The axis of the positioning hole 10 coincides with the central line of the through hole 21 of the incident collimator 2. The X-ray absorber 11 is arranged in the positioning hole 10. The X-ray absorber 11 prevents the array detector 5 from being irradiated and damaged by the high-flux incident X-ray beam 7, and determines a position at which a maximum intensity of the incident X-rays 12 passing through the X-ray absorber 11 by detecting distribution of intensities of the incident X-ray 12 passing through the X-ray absorber 11, that is, determine a position of a center of the Debye ring of diffraction.

The measurement and analysis method according to this embodiment refer to the method in the fourth embodiment. In this embodiment, the method includes the following steps 1 to 6.

(1) In step 1, a nickel-based superalloy, with a thickness of 6 mm and a size of 100 mm*15 mm, is selected as a sample. A short-wavelength characteristic X-ray Auk α is selected by setting an upper threshold and a lower threshold of energy of the detection photons to be 65 keV and 73 keV respectively. Pixels of the array detector detect Auk α.

(2) In step 2, the sample the placed to be parallel to the X axis along a length of the sample and be parallel to the Y axis along a width of the sample.

(3) In step 3, a tube voltage is set to be 200 Kv and a tube current is set to be 12 mA to start the X-ray irradiation system.

(4) In step 4, the sample is exposed for 200 s for measurement. Based on comparison of three strong lines, it is determined that main phases of the crystal material of the to-be-measured part are $AlNi_3$ of a simple cubic crystal system and Ni of an f c. c. crystal system.

(5) In step 5, in each of diffraction crystal planes, diffraction intensities of a Debye spot or a Debye ring in the diffraction crystal plane in different directions are measured, and then the sample is determined a strong-texture sample.

(6) In step 6, six strong diffraction spots, that may be in different diffraction crystal planes and in different diffraction directions, of the $AlNi_3$ are selected based on the measurement results in step 5. The to-be-measured part inside the sample and the corresponding part of the stress-free standard sample are exposed for measurement 12 times, and the to-be-measured part inside the sample and the corresponding part of the stress-free standard sample are respectively exposed for 400 s in each time. Strains in six directions are obtained. The strains are substituted into the equation (6) to solve the linear equations simultaneously to obtain a strain $\varepsilon_{ij}$ (where i=x,y,z and j=x,y,z). Linear transformation is performed on E to obtain three principal strains $\varepsilon^D_{xx}$, $\varepsilon^D_{yy}$ and $\varepsilon^D_{zz}$ and obtain directions of the principal strains. The obtained $\varepsilon^D_{xx}$, $\varepsilon^D_{yy}$ and $\varepsilon^D_{zz}$ are substituted into the equation (7) to obtain a stress tensor a of the to-be-measured part inside the sample or magnitudes and directions of three principal stresses $\sigma^D_{xx}$, $\sigma^D_{yy}$ and a$\sigma^D_{zz}$.

It should be noted that the elastic modulus $E_{hkl}$ and the Poisson ratio $v_{hkl}$ in the calculation correspond to the (hkl) crystal plane.

Sixth Embodiment

A sample in this embodiment is a low-carbon rolled steel plate with a thickness of 8 mm and a size of 400 mm in RD direction*400 mm in TD direction. The rolled steel plate is in a plane stress state, and directions of principal stresses of the sample are in the RD direction and the TD direction. The device used in this embodiment is the same as the device used in the fourth embodiment, and the main differences are described as follows.

(1) A 320 KV reflective uranium target X-ray machine 1 is used as a radiation source to measure a diffraction pattern of Uk $\alpha_1$.

(2) The length of the incident collimator 2 is 75 mm. The cross section of the through hole 21 of the incident collimator 2 is a circular hole with a diameter of 0.05 mm. The divergence of the incident collimator 2 is 0.08°.

(3) The array detector 5 is a Cadmium telluride array detector with a thickness of 2 mm. Each of detection pixels of the array detector 5 has a size of 0.075 mm*0.075 mm, and each of the detection pixels performs single-photon measurement. The array detector 5 is a dual-energy array detector with two energy thresholds. Each of pixels can measure a diffracted Uk $\alpha_1$ X-ray.

(4) The length of the receiving collimator 4 is 675 mm. The cross section of the through hole 6 of the receiving collimator 4 is an annular through hole. The half vertex angle of the inner cone edge 61 is represented by γ, that is, the angle between the inner cone edge 61 and the incident X-ray beam 7 is represented by γ, where γ is equal to 3.0°. The angle δ between the inner cone edge 61 and the inner cone edge 62 of the through hole 6 is equal to 4.0°. The radiuses of the annular hole at the thin end, near the sample 3, of the receiving collimator 4 are 3.9 mm and 9.2 mm. The radiuses of the annular hole at the thick end, installed on the array detector 5, of the receiving collimator 4 are 39.3 mm and 92.1 mm. The distance between the to-be-measured part inside the sample 3 and the thin end of the receiving collimator 4, that is, the distance between the center 9 of the diffractometer circle and the thin end of the receiving collimator 4, is 75 mm. The distance between the center 9 of the diffractometer circle and the array detector 5 is 750 mm.

(5) A circular positioning hole 10 with a diameter of 2 mm is defined in the central part of the receiving collimator 4 for determining a position at which a maximum intensity of the incident X-ray beam 12 passing through the X-ray absorber 11, that is, for determining a position of a center of a Debye ring of diffraction.

The measurement and analysis method according to this embodiment refer to the method in the fourth embodiment. In this embodiment, the method includes the following steps 1 to 5.

(1) In step 1, a low-carbon rolled steel plate, with a thickness of 8 mm and a size of 400 mm in RD direction*400 mm in TD direction is taken as a sample. The rolled steel plate in a plane stress state. Directions of principal stresses are in the RD direction and the TD direction. A short-wavelength characteristic X-ray Auk α is selected by setting an upper threshold and a lower threshold of the energy of the detection photons to be 93 keV and 103 keV respectively. Pixels of the array detector detect Uk α.

(2) In step 2, the rolled steel plate, with a thickness of 8 mm and a size of 400 mm in RD direction*400 mm in TD direction, is fixed on the sample table, so that an incident ray is vertically incident on the steel plate. The TD direction is parallel to the X axis, and the RD direction is parallel to the Y axis. A to-be-measured part inside the sample is placed at the center of the diffractometer circle with an X-Y-Z translation system.

(3) In step 3, a tube voltage is set to be 280 Kv and a tube current is set to be 5 mA to start the X-ray irradiation system.

(4) In step 4, the sample is exposed for 900 s for measurement. Based on comparison of three strong lines, it is determined that a main phase of the crystal material of the to-be-measured part is α-Fe of the f c. c. crystal system.

(5) In step 5, the sample 3 is rotated by rotating the ψ angle turntable, so that the incident X-ray beam 7 is vertically incident on the sample and passes through the to-be-measured part inside the sample, and is vertically incident on the stress-free standard sample and passes through the corresponding part of the stress-free standard sample. The sample 3 and the stress-free standard sample are exposed for 1200 s for measurement to obtain Debye rings of diffraction in strong diffraction crystal planes α-Fe(110), α-Fe(200) and α-Fe(211) of the to-be-measured part inside the sample and obtain Debye rings of diffraction in strong diffraction crystal planes α-Fe(110), α-Fe(200) and α-Fe(211) of the corresponding part of the stress-free standard sample.

(6) A peak determination result in a direction near the transverse direction TD and a peak determination result in a direction near the rolling direction RD are selected from the peak determination results of the to-be-measured part inside the sample, and a peak determination result in a direction near the transverse direction TD and a peak determination result in a direction near the rolling direction RD are selected from the peak determination results of the corresponding part of the stress-free standard sample. Alternatively, an arithmetic mean of peak determination results of the to-be-measured part inside the sample in the two directions near the transverse direction TD and an arithmetic mean of peak determination results of the to-be-measured part inside the sample in the two directions near the rolling direction RD are calculated. An arithmetic mean of peak determination results of the certain part of the stress-free standard sample in the two directions near the transverse direction TD and an arithmetic mean of peak determination results of the corresponding part of the stress-free standard sample in the two directions near the rolling direction RD are calculated. A strain $E$ (90°–$\theta_{110}$, 90°) of the to-be-measured part inside the sample in the transverse direction TD and a strain $\varepsilon(90°–\theta_{110}, 0°)$ of the to-be-measured part inside the sample in the rolling direction RD are calculated by using the following equation:

$$\varepsilon = (\sin \theta_{0\text{-}110}/\sin \theta_{s\text{-}110}) - 1$$

(7) Since $\theta_{110} \approx 1.78° < 5.5°$, $\varepsilon_{TD} = \varepsilon(0°, 90°) = \varepsilon(90°–\theta_{110}, 90°)$, and $\varepsilon_{RD} = \varepsilon(90°, 0) = \varepsilon(90°–\theta_{110}, 0°)$, the obtained strains $\varepsilon_{TD}$ and $\varepsilon_{RD}$ are substituted into equations (2) and (3) to obtain principal stresses $\sigma_{TD}$ and $\sigma_{RD}$ in the two directions, that is, a tensor σ of the to-be-measured part inside the sample.

(8) In step 7, similarly, on the Debye rings of the diffraction in the crystal plane α-Fe(200) or the crystal plane α-Fe(211) of the to-be-measured part inside the sample, strains are measured in multiple directions in which maximum diffraction intensities can be achieved. Two principal strains $\varepsilon_{TD}$ and $\varepsilon_{RD}$ are calculated by using equations (4) and (5). Principal stresses $\sigma_{TD}$ and $\sigma_{RD}$ in the two directions, that is the tensor a of the to-be-measured part inside the sample, are calculated by using the equations (2) and (3). In order to improve the accuracy, an arithmetic mean of multiple stress tensors is calculated to obtain the principal stresses $\sigma_{TD}$ and $\sigma_{RD}$ in the two directions of the to-be-measured part inside the sample, that is, the stress tensor σ.

With the device and method according to the fourth embodiment, it takes only a few minutes to measure a diffraction pattern in the crystal plane Al(111) of a part (the to-be-measured part) of an aluminum plate with a thickness of 20 mm, achieving a measurement efficiency 10 times higher than the measurement efficiency with the technical solutions disclosed in the documents in the background. Moreover, with the device and method according to the present disclosure, a precision goniometer including double turntables is unnecessary, greatly simplifying the structure and operations.

The invention claimed is:

1. A device for measuring short-wavelength characteristic X-ray diffraction based on array detection, comprising an X-ray irradiation system, a sample table and an X-ray detection system, wherein
the X-ray irradiation system comprises a radiation source and an incident collimator (2), the radiation source comprises a heavy metal target X-ray tube (1) with an atomic number greater than 55, a high-voltage power supply with a power supply voltage greater than 160kv, and a controller;
X-rays emitted by the X-ray irradiation system pass through the incident collimator (2) to form an incident X-ray beam (7), and the incident X-ray beam (7) irradiates a to-be-measured part inside a sample fixed on the sample table;
the X-ray detection system comprises a receiving collimator (4) and an array detector (5) matched with the receiving collimator (4);
the array detector (5) is configured to detect and receive a diffraction ray (8) that is diffracted by the to-be-measured part inside the sample and passes through a through hole A (6) of the receiving collimator (4), and other stray rays passing through the through hole A (6) of the receiving collimator (4);
an extension line of a first inner cone edge (61) of the through hole A (6) intersects with an extension line of a second inner cone edge (62) of the through hole A (6) at an intersection point on a central line of the incident X-ray beam (7), the intersection point is a center of a diffractometer circle of the device, and the to-be-measured part inside the sample is placed at the center of the diffractometer circle of the device;
each of detection pixels of the array detector (5) is configured to perform single-photon measurement, the array detector (5) is a multi-energy array detector with two or more energy thresholds, and each of the detection pixels is capable of measuring one or more short-wavelength characteristic X-ray based on predetermined energy thresholds; or the array detector (5) is an energy dispersive array detector;
a through hole B (21) of the incident collimator (2) is a circular hole or a rectangular hole;
a length of the incident collimator (2) ranges from 20 mm to 200 mm;
a divergence of the incident collimator (2) ranges from 0.02° to 05°;
a length of the receiving collimator (4) ranges from 100 mm to 1200 mm;
an angle between the first inner cone edge (61) of the through hole A(6) and the incident X-ray beam (7) is represented by γ, and γ ranges from 2° to 10°;
an angle between the first inner cone edge (61) of the through hole A(6) and the second inner cone edge (62) of the through hole A(6) is represented by δ, and δ ranges from 0.5° to 6°; and
a sum of γ and δ is not greater than 12°.

2. The device for measuring short-wavelength characteristic X-ray diffraction based on array detection according to claim 1, wherein
a positioning hole (10) is defined in a central part of the receiving collimator (4), an axis of the positioning hole (10) coincides with a central line of the incident collimator (2), and an X-ray absorber (11) is arranged in the positioning hole (10); and
the incident collimator (2), the receiving collimator (4) and a shielding box of the array detector (5) are made of heavy metal materials meeting shielding requirements for shielding stray X-rays from other parts and other directions, wherein X-rays pass through the through hole B(21) of the incident collimator (2), the through hole A(6) of the receiving collimator (4), the positioning hole (10), the X-ray absorber in the positioning hole (10), and a receiving window of the shielding box of the array detector (5), and then enter a detection region of the array detector (5).

3. The device for measuring short-wavelength characteristic X-ray diffraction based on array detection according to claim 2, wherein
the X-ray irradiation system, the sample table and the X-ray detection system are fixed on a same platform; the sample (3) is fixed on a translation table (31) of the sample table; the translation table (31) is fixed on a Φ angle turntable (32); the Φ angle turntable (32) is fixed on a ψ angle turntable (33); the ψ angle turntable (33) is fixed on the platform, and a rotation axis of the Φ angle turntable (32) and a rotation axis of the ψ angle turntable (33) are perpendicular to each other and intersect at the center (9) of the diffractometer circle, wherein the to-be-measured part inside the sample (3) is always located at the center (9) of the diffractometer circle without moving with rotation of the Φ angle turntable or the ψ angle turntable, and coordinates of the center (9) of the diffractometer circle are set to (0,0,0); or
the X-ray irradiation system and the X-ray detection system are fixed on a angle turntable (33); the ψ angle turntable (33) and the sample table comprising a translation table (31) and a Φ angle turntable (32) are fixed on a same platform; the sample (3) is fixed on the translation table (31) of the sample table; the translation table (31) is fixed on the Φ angle turntable (32); the Φ angle turntable (32) is fixed on the platform, and a rotation axis of the Φ angle turntable (32) and a rotation axis of the ψ angle turntable (33) are perpendicular to each other and intersect at the center (9) of the diffractometer circle, wherein the to-be-measured part inside the sample (3) is always located at the center (9) of the diffractometer circle without moving with rotation of the Φ angle turntable or the ψ angle turntable, and coordinates of the center (9) of the diffractometer circle are set to (0,0,0).

4. The device for measuring short-wavelength characteristic X-ray diffraction based on array detection according to claim 3, wherein
a central line of the positioning hole (10) coincides with the central line of the incident collimator (2), and is parallel to a Z axis of the translation table (31) in a case of ψ=0°;

coordinates of a center of the Debye ring of diffraction do not change with rotation or translation of the sample;

a distance between the center (9) of the diffractometer circle and the array detector (5) is represented by t ranging from 150 mm to 1500 mm; and the coordinates of the center of the Debye ring are set to (0,0,−t).

5. The device for measuring short-wavelength characteristic X-ray diffraction based on array detection according to claim 1, wherein:

detection pixels of the array detector (5) range from 0.02 mm to 0.2 mm; and the array detector (5) is a cadmium telluride array detector, a cadmium zinc telluride array detector or a gallium arsenide array detector.

6. A measurement and analysis method based on the device for measuring short-wavelength characteristic X-ray diffraction according to any one of claim 1, comprising:

step 1, selecting a short-wavelength characteristic X-ray with an appropriate wavelength based on a material and a thickness of the sample, and setting two energy thresholds of the array detector (5);

step 2, fixing the sample (3) on the sample table, and placing the to-be-measured part inside the sample at the center (9) of the diffractometer circle;

step 3, applying a tube voltage greater than 1.5 times a target excitation voltage based on the selected short-wavelength characteristic X-ray to start the X-ray irradiation system;

step 4, exposing and measuring a Debye ring or a diffraction pattern of diffraction of a crystal material of the to-be-measured part, performing peak determination, and comparing the Debye ring or the diffraction pattern with a powder diffraction file (PDF) to determine a phase of the crystal material of the to-be-measured part;

step 5, to obtain a texture or an orientation of a main phase of the to-be-measured part, rotating the $\psi$ angle turntable (33) to perform step-by-step scanning and measurement to expose and measure Debye rings of diffraction of the crystal material of the to-be-measured part at different $\psi$ angles; performing peak determination to measure, for each of diffraction crystal planes, diffraction intensities of a Debye ring in the diffraction crystal plane in different directions; performing absorption correction based on a diffraction path length to obtain, for each of the diffraction crystal planes, corrected diffraction intensities of the Debye ring in the diffraction crystal plane in different directions; obtaining transmission pole maps of the main phase in a plurality of strong diffraction crystal planes and relatively strong diffraction crystal planes; and selecting the transmission pole maps of the main phase in the plurality of strong diffraction crystal planes according to a crystal system type to calculate a full pole map or an orientation distribution function (ODF) of the plurality of strong diffraction crystal planes;

step 6, to measure a residual stress of the to-be-measured part, measuring strains of one (hkl) crystal plane or more (hkl) crystal planes of the main phase in a plurality of directions, and calculating a stress tensor o of the to-be-measured part inside the sample based on a stress-strain relationship in elastic mechanics; and step 7, to measure phases, textures and stresses in other to-be-measured parts of the sample, repeatedly performing steps 4, 5, and 6 until all the other to-be-measured parts are measured, and performing data processing to obtain the phases, the textures, the stresses, and distributions of the stresses of all the other to-be-measured parts of the sample.

7. The measurement and analysis method according to claim 6, wherein:

in step 6, in measuring a residual stress of a sample in a plane stress state, a stress tensor σ of a to-be-measured part inside the sample is obtained only by exposing and measuring a Debye ring or a strong diffraction spot of diffraction of the to-be-measured part inside the sample in each of crystal planes of the to-be-measured part once and exposing and measuring a Debye ring or a strong diffraction spot of diffraction of a corresponding part of a stress-free standard sample in each of crystal planes of the corresponding part once, wherein the $\psi$ angle turntable (33) is rotated until a surface normal of the to-be-measured part inside the sample and a surface normal of the corresponding part of the stress-free standard sample are coincident with the incident X-ray beam (7);

a Debye ring of diffraction of the to-be-measured part inside the sample in each of the crystal planes of the to-be-measured part and a Debye ring of diffraction of the corresponding part of the stress-free standard sample in each of the crystal planes of the corresponding part are respectively exposed and measured;

peak determination is performed to obtain, for each of the crystal planes of the to-be-measured part inside the sample, diffraction angles 2 $\theta_{s\text{-}hkl}$ of the to-be-measured part in the crystal plane in different directions and obtain, for each of the crystal planes of the corresponding part of the stress-free standard sample, diffraction angles 2 $\theta_{0\text{-}hkl}$ of the corresponding part in the crystal plane in different directions;

a strain $\varepsilon(90°-\theta_{hkl}, \Phi)$ is calculated by using the following equation (1):

$$\varepsilon = \frac{d_{s-hkl} - d_{0-hkl}}{d_{0-hkl}} = \frac{\Delta d_{hkl}}{d_{0-hkl}} = \frac{\sin\theta_{0-hkl}}{\sin\theta_{s-hkl}} - 1 \qquad (1)$$

and the stress tensor σ of the to-be-measured part inside the sample is calculated by using the following equations (2) and (3):

$$\sigma_{xx} = \frac{E_{hkl}}{1 + \upsilon_{hkl}^2}(\varepsilon_{xx} + \upsilon_{hkl}\varepsilon_{yy}) \qquad (2)$$

$$\sigma_{yy} = \frac{E_{hkl}}{1 + \upsilon_{hkl}^2}(\varepsilon_{yy} + \upsilon_{hkl}\varepsilon_{xx}). \qquad (3)$$

in a case that Debye rings or strong diffraction spots in a plurality of strong diffraction crystal planes and relatively strong diffraction (hkl) crystal planes are measured, strains $\varepsilon(90°-\theta_{hkl}, \Phi)$ and distributions of the strains $\varepsilon(90°-\theta_{hkl}, \Phi)$ of the plurality of strong diffraction crystal planes and relatively strong diffraction (hkl) crystal planes are calculated, then a plurality of stress tensors σ are calculated based on the calculated $\varepsilon(90°-\theta_{hkl}, \Phi)$ and distributions of $\varepsilon(90°-\theta_{hkl}, \Phi)$ of the plurality of strong diffraction crystal planes and relatively strong diffraction (hkl) crystal planes, and then an accurate stress tensor σ is calculated by using an arithmetic mean algorithm or a least square algorithm.

8. The measurement and analysis method according to claim 7, wherein in measuring a residual stress of a sample having a strong texture,
a direction in which a strain is measured is determined based on the texture;
a strong diffractive (hkl) crystal plane to be measured is determined,
a maximum diffraction intensity is obtained on an outermost circle in a pole map of the (hkl) crystal plane and is in directions of two principal stresses $\varepsilon_{xx}$ and $\varepsilon_{yy}$ or near the directions of the two principal stresses; and
$\varepsilon(90°-\theta_{hkl}, 90°+\alpha)$ and $\varepsilon(90°-\theta_{hkl}, \beta)$ are obtained by performing exposure and measurement, the measured strain $\varepsilon(90°-\theta_{hkl}, 90°+\alpha)$ is represented by $\varepsilon_\alpha$, and the measured strain 249 $(90°-\theta_{hkl}, \beta)$ is represented by $\varepsilon_\beta$;
principal strains $\varepsilon_{xx}$ and $\varepsilon_{yy}$ respectively in the directions of the two principal stresses $\sigma_{xx}$ and $\sigma_{yy}$ are calculated by using the following equations (4) and (5):

$$\varepsilon_{xx} = \frac{\varepsilon_\alpha \cos^2\beta - \varepsilon_\beta \sin^2\alpha}{\cos^2\alpha\cos^2\beta - \sin^2\alpha\sin^2\beta} \quad (4)$$

$$\varepsilon_{yy} = \frac{\varepsilon_\beta \cos^2\alpha - \varepsilon_\alpha \sin^2\beta}{\cos^2\alpha\cos^2\beta - \sin^2\alpha\sin^2\beta} \quad (5)$$

$\varepsilon_{xx}$ and $\varepsilon_{yy}$ are substituted into equations (2) and (3) to obtain the two principal stresses $\sigma_{xx}$ and $\sigma_{yy}$, that is, the stress tensor $\sigma$ of the to-be-measured part inside the sample.

9. The measurement and analysis method according to claim 6, wherein
in step 6, for a sample in a general stress state,
a stress tensor $\sigma$ of a to-be-measured part inside the sample is obtained by, at each of two different $\psi$ angles, exposing and measuring a Debye ring or a strong diffraction spot of diffraction of the to-be-measured part inside the sample in crystal planes of the to-be-measured part once and exposing and measuring a Debye ring or a strong diffraction spot of diffraction of a corresponding part of a stress-free standard sample in crystal planes of the corresponding part once, wherein
the $\psi$ angle turntable (33) is rotated until $\psi=\psi_1$, then a Debye ring of diffraction of the to-be-measured part inside the sample in each of the crystal planes of the to-be-measured part and a Debye ring of diffraction of the corresponding part of the stress-free standard sample in each of the crystal planes of the corresponding part are respectively exposed and measured;
the $\psi$ angle turntable (33) is rotated until $\psi=\psi_2$, then a Debye ring of diffraction of the to-be-measured part inside the sample in each of the crystal planes of the to-be-measured part and a Debye ring of diffraction of the corresponding part of the stress-free standard sample in each of the crystal planes of the corresponding part are respectively exposed and measured;
peak determination is performed;
peak determination results $2\theta_{s\text{-}hkl}$ and $2\theta_{0\text{-}hkl}$ of the (hkl) crystal plane in six directions are selected;
strains $\varepsilon(\psi_i, \Phi_i)$ of the (hkl) crystal plane in the six directions $\varepsilon(\psi_i, \Phi_i)$ are calculated by using the following equation (1):

$$\varepsilon = \frac{d_{s\text{-}hkl} - d_{0\text{-}hkl}}{d_{0\text{-}hkl}} = \frac{\Delta d_{hkl}}{d_{0\text{-}hkl}} = \frac{\sin\theta_{0\text{-}hkl}}{\sin\theta_{s\text{-}hkl}} - 1 \quad (1)$$

$$\varepsilon(\Psi_i, \Phi_i) = a_i^2\varepsilon_{xx} + b_i^2\varepsilon_{yy} + c_i^2\varepsilon_{yy} + 2a_ib_i\varepsilon_{xy} + 2b_ic_i\varepsilon_{yz} + 2c_ia_i\varepsilon_{zx} \quad (6)$$

the above linear equations are simultaneously solved to obtain a strain $\varepsilon_{ij}$(i=x,y,z; j=x,y,z), and linear transformation is performed on $\varepsilon_{ij}$ to obtain three principal strains $\varepsilon^D_{xx}$, $\varepsilon^D_{yy}$, and $\varepsilon^D_{zz}$; and
the stress tensor $\sigma$ of the to-be-measured part inside the sample is calculated by using the following equation (7):

$$\begin{bmatrix} \sigma^D_{XX} & & \\ & \sigma^D_{YY} & \\ & & \sigma^D_{ZZ} \end{bmatrix} = \frac{E}{(1+v)}\begin{bmatrix} \varepsilon^D_{XX} & & \\ & \varepsilon^D_{YY} & \\ & & \varepsilon^D_{ZZ} \end{bmatrix} + \frac{vE}{((1-2v)(1+v))}(\varepsilon^D_{XX} + \varepsilon^D_{YY} + \varepsilon^D_{ZZ})\begin{bmatrix} 1 & & \\ & 1 & \\ & & 1 \end{bmatrix} \quad (7)$$

10. The measurement and analysis method according to claim 9, wherein
in measuring a residual stress of a sample having a strong texture, a direction in which a strain is measured is determined based on the texture, and the strain is measured in a direction in which a maximum diffraction intensity of the to-be-measured strong diffraction (hkl) crystal plane is obtained, wherein
the $\psi$ angle turntable (33) is rotated; Debye rings of diffraction of the to-be-measured part inside the sample at different $\psi$ angles and Debye rings of diffraction of the corresponding part of the stress-free standard sample are exposed and measured; six strong diffraction spots in strong diffraction crystal planes and relatively strong diffraction (hkl) crystal planes are selected; peak determination is performed; strains $\varepsilon(\psi_i, \Phi_i)$ in the six directions are calculated by using the equation (1); based on the equation (6), the linear equations are simultaneously solved; and linear transformation is performed to obtain three principal strains $\varepsilon^D_{xx}$, $\varepsilon^D_{yy}$, and $\varepsilon^D_{zz}$; and then the stress tensor $\sigma$ or magnitudes and directions of three principal stresses $\sigma^D_{xx}$, $\sigma^D_{yy}$ and $\sigma^D_{zz}$ of the to-be-measured part inside the sample are calculated by using the elastic mechanics equation (7).

\* \* \* \* \*